United States Patent
He et al.

(10) Patent No.: US 12,028,141 B2
(45) Date of Patent: Jul. 2, 2024

(54) INITIAL ACCESS ENHANCEMENTS FOR NETWORK DEPLOYMENTS

(71) Applicant: QUALCOMM Incorporated, San Diego, CA (US)

(72) Inventors: Linhai He, San Diego, CA (US); Jing Jiang, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 34 days.

(21) Appl. No.: 17/931,084

(22) Filed: Sep. 9, 2022

(65) Prior Publication Data
US 2024/0088971 A1    Mar. 14, 2024

(51) Int. Cl.
*H04B 7/06* (2006.01)
*H04W 74/0833* (2024.01)

(52) U.S. Cl.
CPC ......... *H04B 7/0639* (2013.01); *H04B 7/0617* (2013.01); *H04W 74/0833* (2013.01)

(58) Field of Classification Search
CPC . H04B 7/0639; H04B 7/0617; H04Q 74/0833
See application file for complete search history.

(56) References Cited

U.S. PATENT DOCUMENTS

| | | | | |
|---|---|---|---|---|
| 11,770,747 B2* | 9/2023 | Zhang | .................... | H04L 5/0053 370/331 |
| 11,838,746 B2* | 12/2023 | Jiang | ..................... | H04L 5/0055 |
| 2018/0020486 A1* | 1/2018 | Yano | .................... | H04W 72/542 |
| 2018/0176942 A1* | 6/2018 | Kim | ....................... | H04W 72/04 |
| 2018/0343595 A1* | 11/2018 | da Silva | .................. | H04L 5/005 |
| 2020/0205047 A1* | 6/2020 | Bergqvist | .............. | H04W 36/08 |
| 2020/0236726 A1* | 7/2020 | Lee | ......................... | H04W 24/08 |
| 2021/0045170 A1* | 2/2021 | Luo | ........................ | H04W 36/06 |
| 2021/0051524 A1* | 2/2021 | Jung | ..................... | H04W 76/18 |
| 2022/0167333 A1* | 5/2022 | Raghavan | .............. | H04B 7/022 |
| 2023/0189013 A1* | 6/2023 | Park | ...................... | H04W 16/24 370/329 |
| 2023/0217452 A1* | 7/2023 | Kim | ........................ | H04L 5/001 370/329 |
| 2023/0247708 A1* | 8/2023 | Xu | ........................ | H04W 76/20 370/329 |
| 2023/0269790 A1* | 8/2023 | Müller | ............. | H04W 74/0833 370/329 |
| 2023/0328609 A1* | 10/2023 | Zhang | ............ | H04W 36/00725 370/331 |
| 2023/0370951 A1* | 11/2023 | Abotabl | ................ | H04W 48/08 |

* cited by examiner

*Primary Examiner* — Jaison Joseph
(74) *Attorney, Agent, or Firm* — Harrity & Harrity, LLP

(57) ABSTRACT

Various aspects of the present disclosure generally relate to wireless communication. In some aspects, a user equipment (UE) may receive an indication of at least one of: one or more anchor cells associated with a target cell, or one or more target cells, including the target cell, associated with an anchor cell included in the one or more anchor cells. The UE may transmit, to the anchor cell, an indication of the target cell and an indication of a target beam index associated with the target cell as part of an initial access procedure with the anchor cell. The UE may establish a connection with the target cell based at least in part on performing the initial access procedure with the anchor cell. Numerous other aspects are described.

30 Claims, 10 Drawing Sheets

INITIAL ACCESS ENHANCEMENTS FOR NETWORK DEPLOYMENTS

FIELD OF THE DISCLOSURE

Aspects of the present disclosure generally relate to wireless communication and to techniques and apparatuses for initial access enhancements for network deployments.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The UE may include a memory and one or more processors coupled to the memory. The one or more processors may be configured to receive an indication of at least one of: one or more anchor cells associated with a target cell, or one or more target cells, including the target cell, associated with an anchor cell included in the one or more anchor cells. The one or more processors may be configured to transmit, to the anchor cell, an indication of the target cell and an indication of a target beam index associated with the target cell as part of an initial access procedure with the anchor cell. The one or more processors may be configured to establish a connection with the target cell based at least in part on performing the initial access procedure with the anchor cell.

Some aspects described herein relate to a network node for wireless communication. The network node may include a memory and one or more processors coupled to the memory. The one or more processors may be configured to transmit an indication of at least one of one or more cells associated with the network node, wherein the network node supports initial access for the one or more cells, and wherein the one or more cells are associated with a different operating frequency band than the network node. The one or more processors may be configured to receive an indication of a cell, from the one or more cells, and an indication of a target beam index associated with the cell as part of an initial access procedure associated with a UE. The one or more processors may be configured to transmit a communication to cause the UE to establish a connection with the cell based at least in part on performing the initial access procedure.

Some aspects described herein relate to a method of wireless communication performed by a UE. The method may include receiving an indication of at least one of: one or more anchor cells associated with a target cell, or one or more target cells, including the target cell, associated with an anchor cell included in the one or more anchor cells. The method may include transmitting, to the anchor cell, an indication of the target cell and an indication of a target beam index associated with the target cell as part of an initial access procedure with the anchor cell. The method may include establishing a connection with the target cell based at least in part on performing the initial access procedure with the anchor cell.

Some aspects described herein relate to a method of wireless communication performed by a network node. The method may include transmitting an indication of at least one of one or more cells associated with the network node, wherein the network node supports initial access for the one or more cells, and wherein the one or more cells are associated with a different operating frequency band than the network node. The method may include receiving an indication of a cell, from the one or more cells, and an indication of a target beam index associated with the cell as part of an initial access procedure associated with a UE. The method may include transmitting a communication to cause the UE to establish a connection with the cell based at least in part on performing the initial access procedure.

Some aspects described herein relate to a non-transitory computer-readable medium that stores a set of instructions for wireless communication by a UE. The set of instructions, when executed by one or more processors of the UE, may cause the UE to receive an indication of at least one of: one or more anchor cells associated with a target cell, or one or more target cells, including the target cell, associated with an anchor cell included in the one or more anchor cells. The set of instructions, when executed by one or more processors of the UE, may cause the UE to transmit, to the anchor cell, an indication of the target cell and an indication of a target beam index associated with the target cell as part of an initial access procedure with the anchor cell. The set of instructions, when executed by one or more processors of the UE, may cause the UE to establish a connection with the target cell based at least in part on performing the initial access procedure with the anchor cell.

Some aspects described herein relate to a non-transitory computer-readable medium that stores a set of instructions for wireless communication by a network node. The set of instructions, when executed by one or more processors of the network node, may cause the network node to transmit an indication of at least one of one or more cells associated with the network node, wherein the network node supports initial access for the one or more cells, and wherein the one or more cells are associated with a different operating frequency band than the network node. The set of instructions, when executed by one or more processors of the network node, may cause the network node to receive an indication of a cell, from the one or more cells, and an indication of a target beam index associated with the cell as part of an initial access procedure associated with a UE. The set of instructions, when executed by one or more processors of the network node, may cause the network node to transmit a communication to cause the UE to establish a connection with the cell based at least in part on performing the initial access procedure.

Some aspects described herein relate to an apparatus for wireless communication. The apparatus may include means for receiving an indication of at least one of: one or more anchor cells associated with a target cell, or one or more target cells, including the target cell, associated with an anchor cell included in the one or more anchor cells. The apparatus may include means for transmitting, to the anchor cell, an indication of the target cell and an indication of a target beam index associated with the target cell as part of an initial access procedure with the anchor cell. The apparatus may include means for establishing a connection with the target cell based at least in part on performing the initial access procedure with the anchor cell.

Some aspects described herein relate to an apparatus for wireless communication. The apparatus may include means for transmitting an indication of at least one of one or more cells associated with the network node, wherein the network node supports initial access for the one or more cells, and wherein the one or more cells are associated with a different operating frequency band than the network node. The apparatus may include means for receiving an indication of a cell, from the one or more cells, and an indication of a target beam index associated with the cell as part of an initial access procedure associated with a UE. The apparatus may include means for transmitting a communication to cause the UE to establish a connection with the cell based at least in part on performing the initial access procedure.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
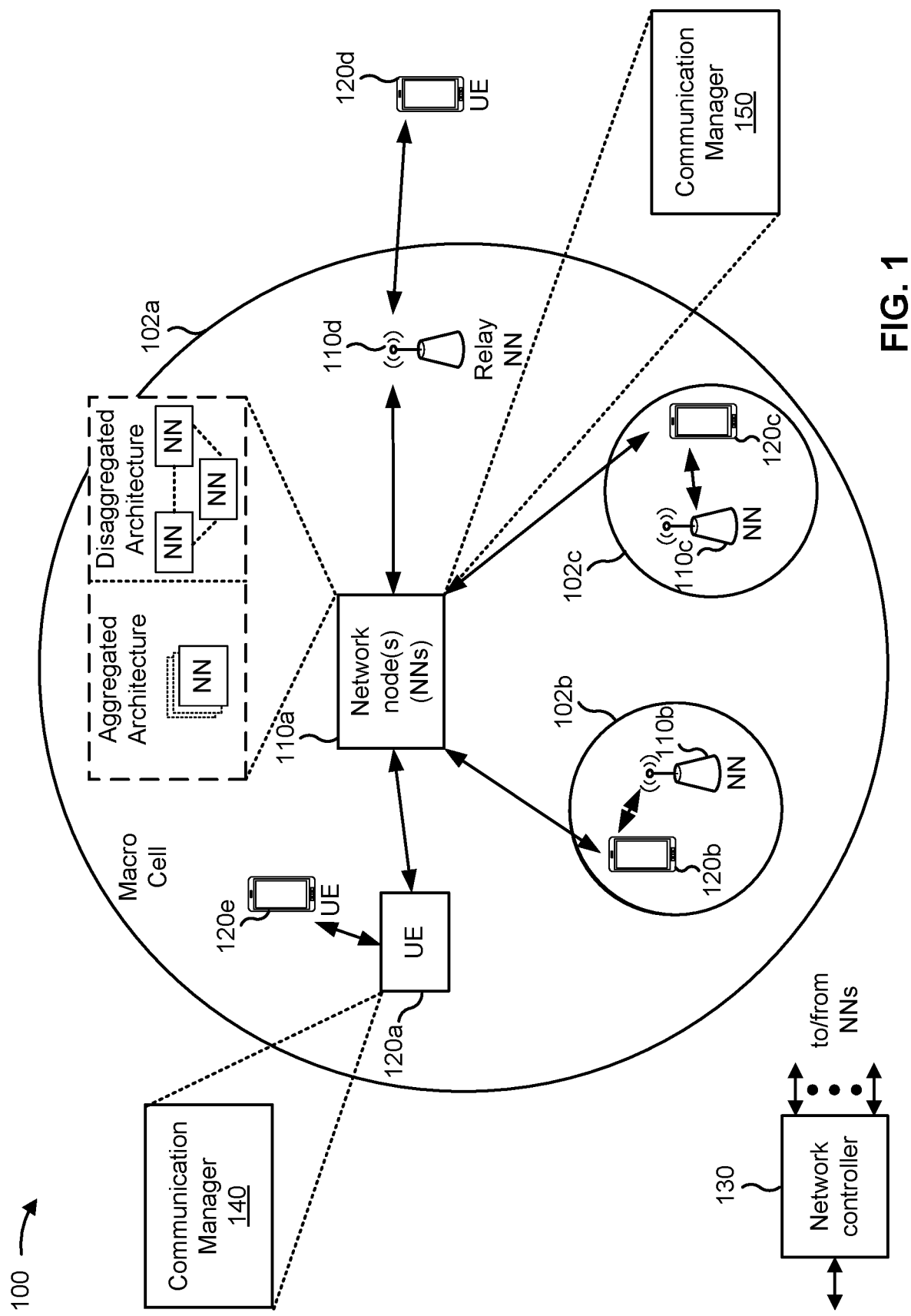
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive an indication of at least one of: one or more anchor cells associated with a target cell, or one or more target cells, including the target cell, associated with an anchor cell included in the one or more anchor cells; transmit, to the anchor cell, an indication of the target cell and an indication of a target beam index associated with the target cell as part of an initial access procedure with the anchor cell; and establish a connection with the target cell based at least in part on performing the initial access procedure with the anchor cell. Additionally, or alternatively, the communication manager 140 may perform one or more other operations described herein.

In some aspects, the network node 110 may include a communication manager 150. As described in more detail elsewhere herein, the communication manager 150 may transmit an indication of at least one of one or more cells associated with the network node, wherein the network node supports initial access for the one or more cells, and wherein the one or more cells are associated with a different operating frequency band than the network node; receive an indication of a cell, from the one or more cells, and an indication of a target beam index associated with the cell as part of an initial access procedure associated with a UE; and transmit a communication to cause the UE to establish a connection with the cell based at least in part on performing the initial access procedure. Additionally, or alternatively, the communication manager 150 may perform one or more other operations described herein.

As indicated above, FIG. 1 is provided as an example. Other examples may differ from what is described with regard to FIG. 1.

Figure 2:
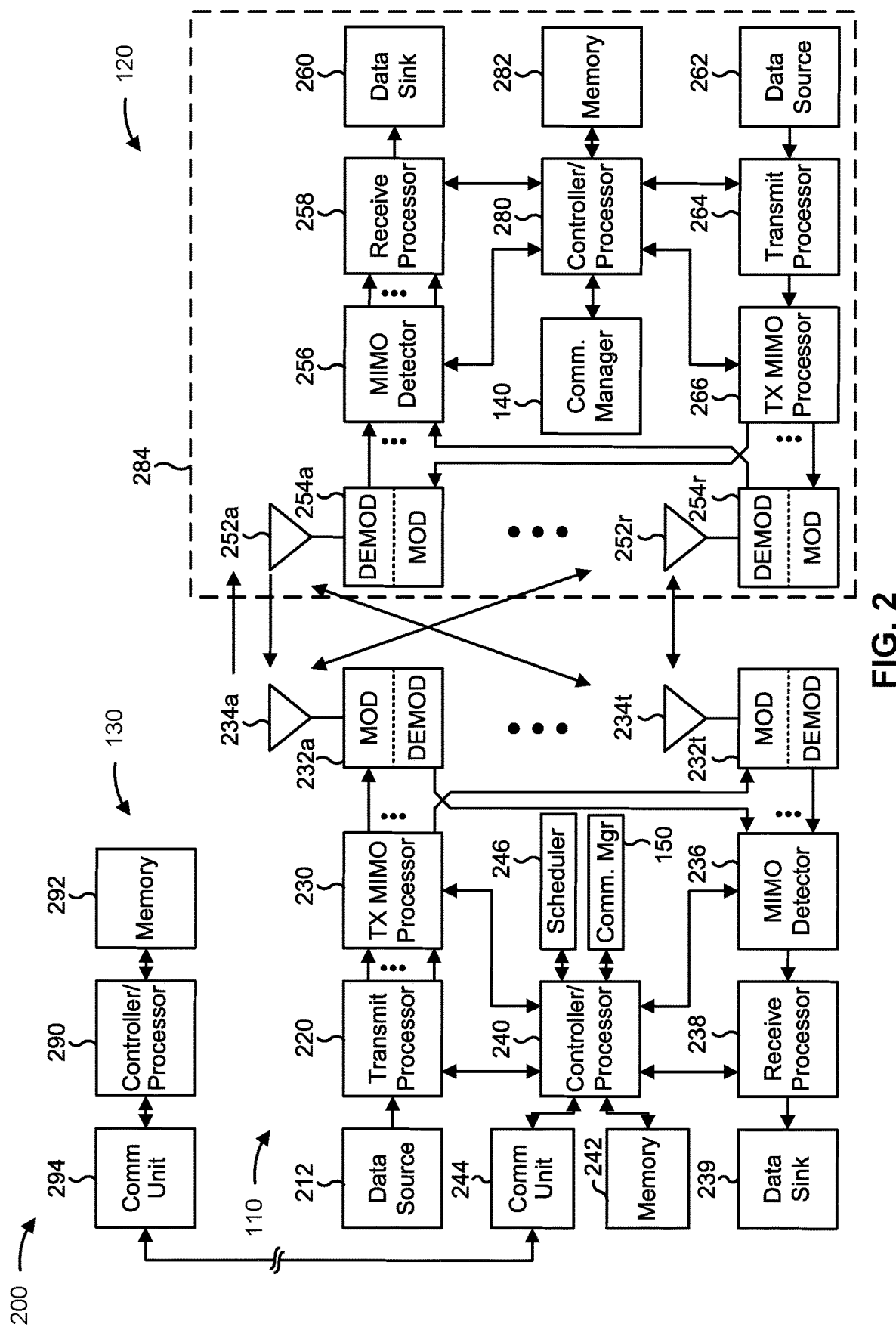
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-10).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-10).

The controller/processor 240 of the network node 110, the controller/processor 280 of the UE 120, and/or any other component(s) of FIG. 2 may perform one or more techniques associated with initial access enhancements for network deployments, as described in more detail elsewhere herein. For example, the controller/processor 240 of the network node 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE 120 includes means for receiving an indication of at least one of: one or more anchor cells associated with a target cell, or one or more target cells, including the target cell, associated with an anchor cell included in the one or more anchor cells; means for transmitting, to the anchor cell, an indication of the target cell and an indication of a target beam index associated with the target cell as part of an initial access procedure with the anchor cell; and/or means for establishing a connection with the target cell based at least in part on performing the initial access procedure with the anchor cell. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for transmitting an indication of at least one of one or more cells associated with the network node, wherein the network node supports initial access for the one or more cells, and wherein the one or more cells are associated with a different operating frequency band than the network node; means for receiving an indication of a cell, from the one or more cells, and an indication of a target beam index associated with the cell as part of an initial access procedure associated with a UE; and/or means for transmitting a communication to cause the UE to establish a connection with the cell based at least in part on performing the initial access procedure. In some aspects, the means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
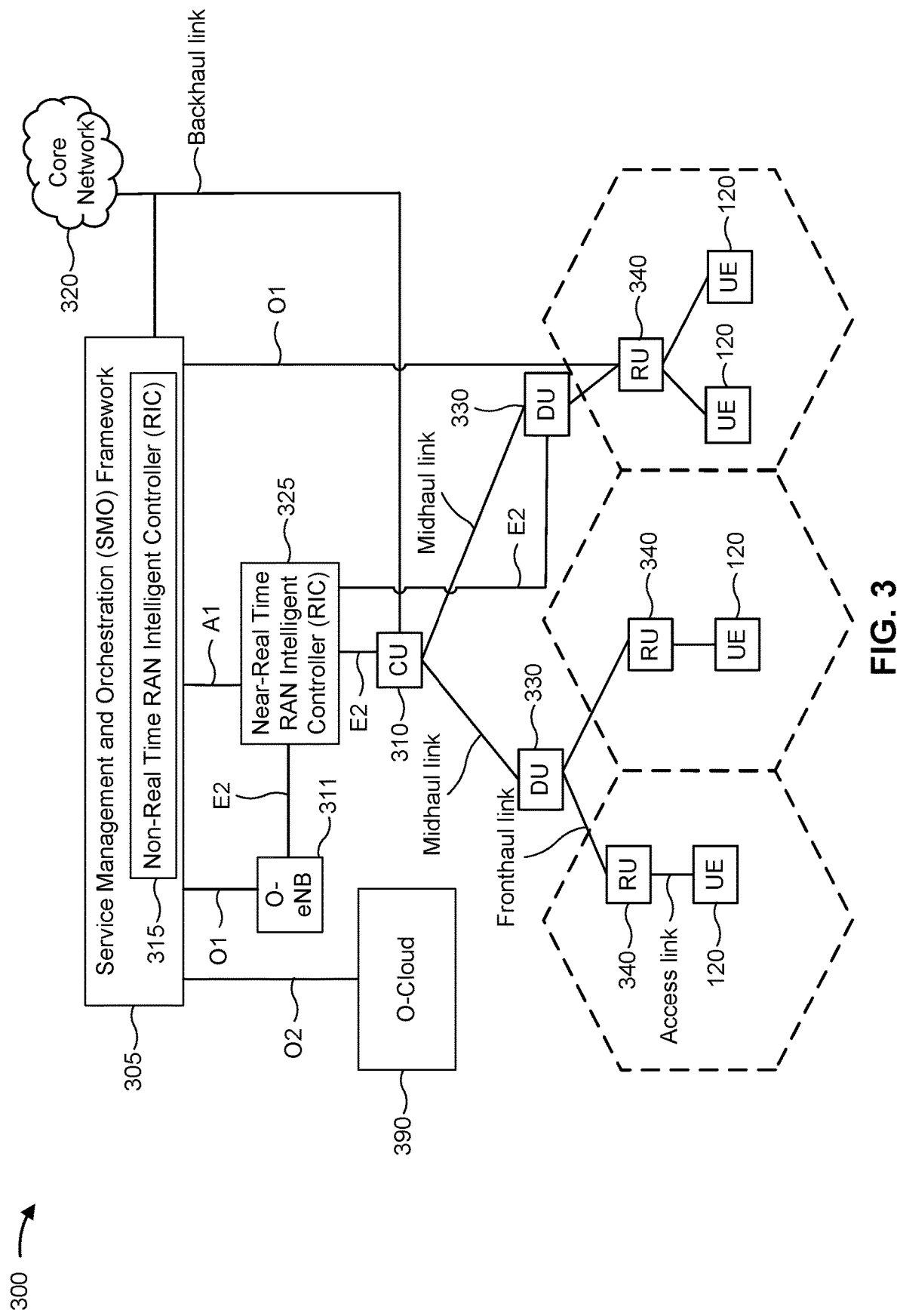
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC)

encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT MC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
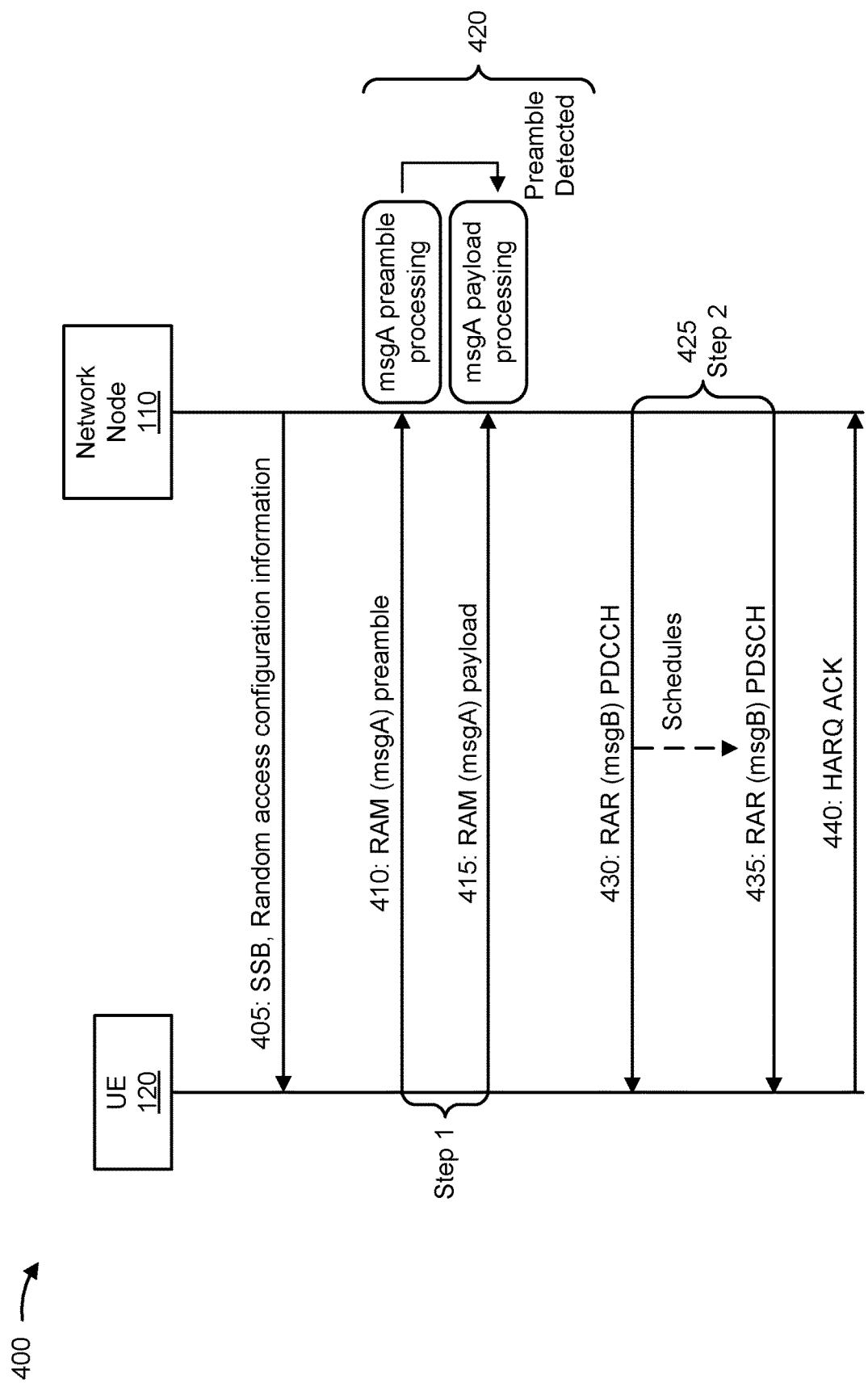
FIG. 4 is a diagram illustrating an example of a two-step random access procedure, in accordance with the present disclosure.

FIG. 4 is a diagram illustrating an example 400 of a two-step random access procedure, in accordance with the present disclosure. As shown in FIG. 4, a network node 110 and a UE 120 may communicate with one another to perform the two-step random access procedure.

As shown by reference number 405, the network node 110 may transmit, and the UE 120 may receive, one or more synchronization signal blocks (SSBs) and random access configuration information. In some aspects, the random access configuration information may be transmitted in and/or indicated by system information (e.g., in one or more system information blocks (SIBs)) and/or an SSB, such as for contention-based random access. Additionally, or alternatively, the random access configuration information may be transmitted in an RRC message and/or a physical downlink control channel (PDCCH) order message that triggers a random access channel (RACH) procedure, such as for contention-free random access. The random access configuration information may include one or more parameters to be used in the two-step random access procedure, such as one or more parameters for transmitting a random access message (RAM) and/or receiving a random access response (RAR) to the RAM.

As shown by reference number 410, the UE 120 may transmit, and the network node 110 may receive, a RAM preamble. As shown by reference number 415, the UE 120 may transmit, and the network node 110 may receive, a RAM payload. As shown, the UE 120 may transmit the RAM preamble and the RAM payload to the network node 110 as part of an initial (or first) step of the two-step random access procedure. In some aspects, the RAM may be referred to as message A, msgA, a first message, or an initial message in a two-step random access procedure. Furthermore, in some aspects, the RAM preamble may be referred to as a message A preamble, a msgA preamble, a preamble, or a PRACH preamble, and the RAM payload may be referred to as a message A payload, a msgA payload, or a payload. In some aspects, the RAM may include some or all of the contents of message 1 (msg1) and message 3 (msg3) of a four-step random access procedure, which is described in more detail below. For example, the RAM preamble may include some or all contents of message 1 (e.g., a PRACH preamble), and the RAM payload may include some or all contents of message 3 (e.g., a UE identifier, uplink control information (UCI), and/or a physical uplink shared channel (PUSCH) transmission).

As shown by reference number 420, the network node 110 may receive the RAM preamble transmitted by the UE 120. If the network node 110 successfully receives and decodes the RAM preamble, the network node 110 may then receive and decode the RAM payload.

As shown by reference number 425, the network node 110 may transmit an RAR (sometimes referred to as an RAR message). As shown, the network node 110 may transmit the RAR message as part of a second step of the two-step random access procedure. In some aspects, the RAR message may be referred to as message B, msgB, or a second message in a two-step random access procedure. The RAR message may include some or all of the contents of message 2 (msg2) and message 4 (msg4) of a four-step random access procedure. For example, the RAR message may include the detected PRACH preamble identifier, the detected UE identifier, a timing advance value, and/or contention resolution information.

As shown by reference number 430, as part of the second step of the two-step random access procedure, the network node 110 may transmit a PDCCH communication for the RAR. The PDCCH communication may schedule a physical downlink shared channel (PDSCH) communication that includes the RAR. For example, the PDCCH communication may indicate a resource allocation (e.g., in downlink control information (DCI)) for the PDSCH communication.

As shown by reference number 435, as part of the second step of the two-step random access procedure, the network node 110 may transmit the PDSCH communication for the RAR, as scheduled by the PDCCH communication. The RAR may be included in a medium access control (MAC) protocol data unit (PDU) of the PDSCH communication. As shown by reference number 440, if the UE 120 successfully receives the RAR, the UE 120 may transmit a hybrid automatic repeat request (HARD) acknowledgement (ACK).

As indicated above, FIG. 4 is provided as an example. Other examples may differ from what is described with regard to FIG. 4.

Figure 5:
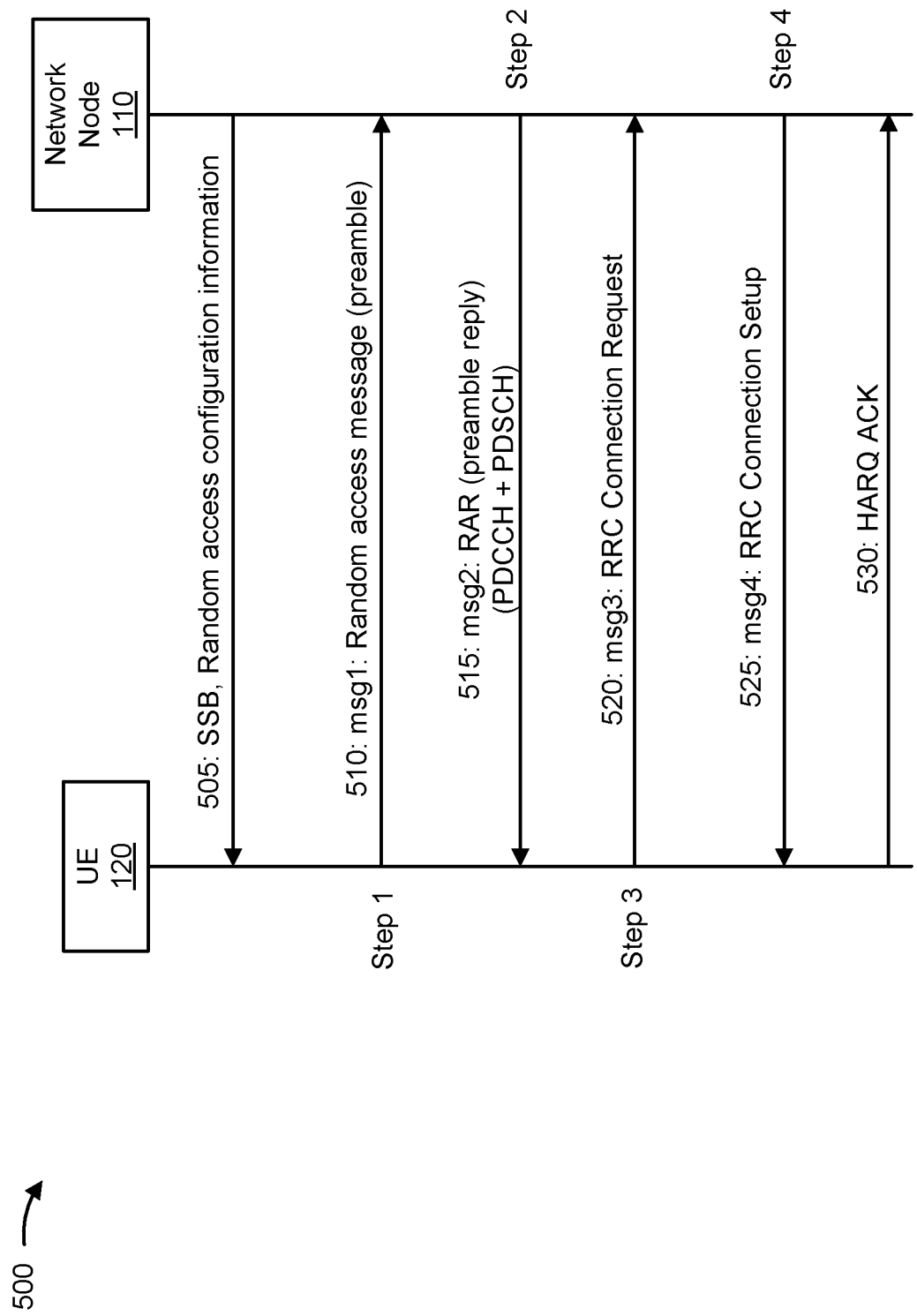
FIG. 5 is a diagram illustrating an example of a four-step random access procedure, in accordance with the present disclosure.

FIG. 5 is a diagram illustrating an example of a four-step random access procedure, in accordance with the present disclosure. As shown in FIG. 5, a network node 110 and a UE 120 may communicate with one another to perform the four-step random access procedure.

As shown by reference number 505, the network node 110 may transmit, and the UE 120 may receive, one or more SSBs and random access configuration information. In some aspects, the random access configuration information may be transmitted in and/or indicated by system information (e.g., in one or more SIBs) and/or an SSB, such as for contention-based random access. Additionally, or alternatively, the random access configuration information may be transmitted in an RRC message and/or a PDCCH order message that triggers a RACH procedure, such as for contention-free random access. The random access configuration information may include one or more parameters to be used in the random access procedure, such as one or more parameters for transmitting a RAM and/or one or more parameters for receiving an RAR.

As shown by reference number 510, the UE 120 may transmit a RAM, which may include a preamble (sometimes referred to as a random access preamble, a PRACH preamble, or a RAM preamble). The message that includes the preamble may be referred to as a message 1, msg1, MSG1, a first message, or an initial message in a four-step random access procedure. The random access message may include a random access preamble identifier.

As shown by reference number 515, the network node 110 may transmit an RAR as a reply to the preamble. The message that includes the RAR may be referred to as message 2, msg2, MSG2, or a second message in a four-step random access procedure. In some aspects, the RAR may indicate the detected random access preamble identifier (e.g., received from the UE 120 in msg1). Additionally, or alternatively, the RAR may indicate a resource allocation to be used by the UE 120 to transmit message 3 (msg3).

In some aspects, as part of the second step of the four-step random access procedure, the network node 110 may transmit a PDCCH communication for the RAR. The PDCCH communication may schedule a PDSCH communication that includes the RAR. For example, the PDCCH communication may indicate a resource allocation for the PDSCH communication. Also as part of the second step of the four-step random access procedure, the network node 110 may transmit the PDSCH communication for the RAR, as scheduled by the PDCCH communication. The RAR may be included in a MAC PDU of the PDSCH communication.

As shown by reference number 520, the UE 120 may transmit an RRC connection request message. The RRC connection request message may be referred to as message 3, msg3, MSG3, or a third message of a four-step random access procedure. In some aspects, the RRC connection request may include a UE identifier, UCI, and/or a PUSCH communication (e.g., an RRC connection request).

As shown by reference number 525, the network node 110 may transmit an RRC connection setup message. The RRC connection setup message may be referred to as message 4, msg4, MSG4, or a fourth message of a four-step random access procedure. In some aspects, the RRC connection setup message may include the detected UE identifier, a timing advance value, and/or contention resolution information. As shown by reference number 530, if the UE 120 successfully receives the RRC connection setup message, the UE 120 may transmit a HARQ ACK.

As indicated above, FIG. 5 is provided as an example. Other examples may differ from what is described with regard to FIG. 5.

In some network deployments, cells may be deployed that operate using high frequency bands, such as the EHF band, FR3, FR4, FR5, a sub-terahertz band (e.g., which may include frequencies that are multiple hundreds of GHz, such as 100 GHz-300 GHz), and/or other high frequency bands. The cells operating using high frequency bands may be referred to herein as "high-band cells." The high-band cells may provide increased data capacity and/or increased throughput for UEs (e.g., because of an increased bandwidth associated with the high frequency bands). For example, a UE 120 and a network node 110 associated with a high-band cell may communicate using a larger bandwidth size, such as a 7.5 GHz bandwidth, among other examples. Communicating using the larger bandwidth size may result in an increased throughput for communications between the UE 120 and the network node 110.

RF constraints and propagation properties that are unique to the high frequency bands may introduce new design challenges for wireless networks. For example, the high frequency bands may be associated with a high path loss. Therefore, to compensate for the high path loss, the network node 110 and the UE 120 may communicate using narrow beams (for example, beams with a narrow beam width or signals with energy concentrated over a narrow directional range). In such examples, spatial division multiplexing (SDM) may be used (for example, where different, spatially separable antenna beams are formed for different UEs). However, the narrow beams may be suspectable to beam blockage, interference, or another intervening factor that degrades performances of signals communicated via the narrow beams. Therefore, high-band cells may be associated with a smaller coverage area (e.g., a geographic area associated with a cell) as compared to cells using a lower operating frequency (e.g., which may be referred to herein as "low-band cells"). Because of the smaller coverage area of high-band cells, in some network deployments, high-band cells may be more densely distributed in the wireless network as compared to low-band cells. For example, multiple high-band network nodes (e.g., multiple RUs) may be deployed within a coverage area of a single low-band network node (e.g., within a coverage area of a low-band cell).

The poor coverage associated with high-band cells may introduce challenges for initial access procedures. For example, a UE 120 attempting to connect with a network node associated with a high-band cell may be unable to successfully receive one or more initial access or RACH communications, such as msgA (e.g., a communication carrying a RAM payload) and/or a msg3, among other examples. As a result, initial access procedures with high-band cells may be associated with a reduced reliability and/or a reduced likelihood of success. Therefore, the UE 120 may consume additional network resources and/or processing resources attempting multiple initial access procedures with the high-band cell and/or may be unable to establish a connection with the high-band cell. Moreover, because of the dense deployment of high-band cells, the UE 120 may be configured with additional resources for initial access procedures (e.g., PRACH resources), thereby increasing a resource allocation overhead associated with the initial access procedures (e.g., two-step RACH procedures and/or four-step RACH procedures).

Some techniques and apparatuses described herein enable initial access enhancements for network deployments. For example, the network deployment may be associated with one or more high-band cells and one or more low-band cells. In some aspects, a UE 120 may perform an initial access procedure (e.g., a RACH procedure) with a low-band cell to facilitate establishing a connection with a high-band cell. For example, the UE 120 may indicate of one or more anchor cells (e.g., low-band cells) associated with a target cell (e.g., a high-band cell with which the UE 120 is to establish a connection) and/or may indicate of one or more target cells, including the target cell, associated with an anchor cell included in the one or more anchor cells. The UE 120 may transmit, to the anchor cell, an indication of the target cell and an indication of a target beam index associated with the target cell as part of an initial access procedure with the anchor cell. In other words, during an initial access procedure with a low-band cell, the UE 120 may transmit an indication of a target cell (e.g., a high-band cell) and a beam associated with the target cell (e.g., the target beam index) to be associated with a connection between the UE 120 and the target cell. The UE 120 may establish a connection with the target cell (e.g., via a beam associated with the target beam index) based at least in part on performing the initial access procedure with the anchor cell.

For example, an anchor cell (e.g., a low-band cell) may support performing initial access procedures for facilitating connections with one or more target cells (e.g., high-band cells). The UE 120 and the anchor cell may perform the initial access procedure. A network node associated with the anchor cell may determine a target cell and/or a beam to be associated with a connection for the UE 120 based at least in part on performing the initial access procedure. Therefore, the network node associated with the anchor cell may quickly handover the UE 120 to the target cell after performing the initial access procedure.

As a result, a reliability and/or a likelihood of success of initial access procedures for connecting to high-band cells may be improved. For example, the anchor cell (e.g., the low-band cell) may be associated with better coverage and/or higher reliability as compared to a target cell (e.g., a high-band cell). Therefore, by enabling the UE 120 to perform the initial access procedure (e.g., a RACH procedure) with the anchor cell and then be handed over to the target cell (e.g., the high-band cell), a reliability and/or a likelihood of success of initial access procedure may be improved (e.g., compared to if the UE 120 were to perform the initial access procedure directly with the target cell). This may enable the UE 120 to establish a connection with the target cell, thereby improving throughput and/or data rates of communications associated with the UE 120 (e.g., because the UE 120 is enabled to establish a connection with the high-band cell). Additionally, because each target cell (e.g., each high-band cell) may not be associated with separate initial access configurations (e.g., separate PRACH configurations), a resource allocation overhead associated with initial access procedures in a wireless network (e.g., that includes both high-band cells and low-band cells) may be reduced.

Figure 6:
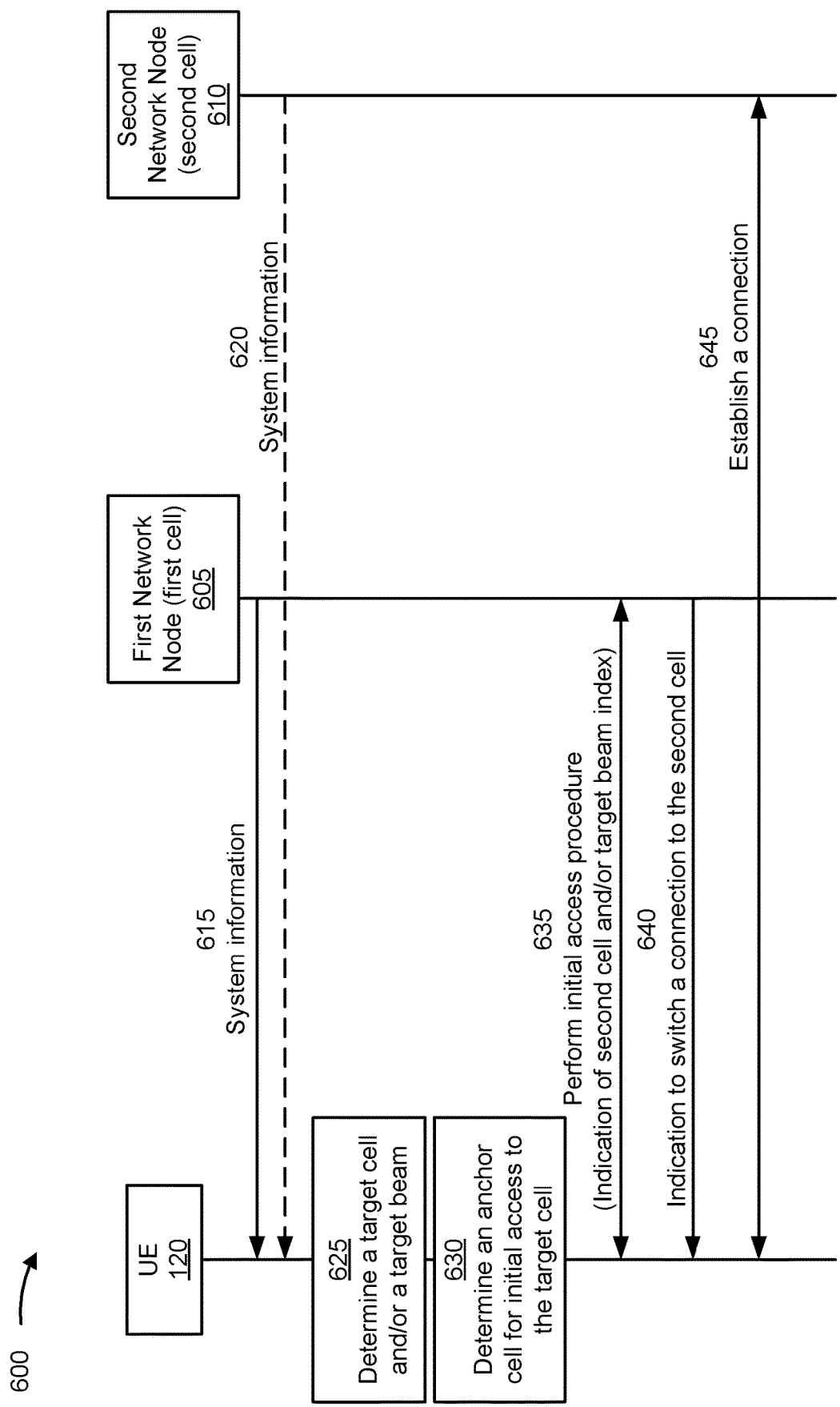
FIG. 6 is a diagram illustrating an example associated with initial access enhancements for network deployments, in accordance with the present disclosure.

FIG. 6 is a diagram illustrating an example 600 associated with initial access enhancements for network deployments, in accordance with the present disclosure. As shown in FIG. 6, a first network node 605 (e.g., a network node 110, a base station, a CU, a DU, and/or an RU) and/or second network node 610 (e.g., a network node 110, a base station, a CU, a DU, and/or an RU) may communicate with a UE 120. In some aspects, the first network node 605, the second network node 610, and the UE 120 may be part of a wireless network (e.g., the wireless network 100).

The first network node 605 may be associated with a first cell and the second network node 610 may be associated with a second cell. In some aspects, the first cell may be an anchor cell for the second cell. As used herein, an "anchor" cell may be a cell (or a network node) that supports performing initial access procedures (e.g., contention-based random access procedures) with the UE 120 to facilitate the establishment of a connection between another cell and the UE 120 (e.g., the second cell), as described in more detail elsewhere herein. In some aspects, the second cell may be referred to as a "target" cell. A target cell may be a cell that the UE 120 identifies and/or selects for establishing a communication link or connection. In some aspects, the first cell may be associated with a first operating frequency range and/or a first RAT. The second cell may be associated with a second operating frequency range and/or a second RAT. For example, the first cell may be a low-band cell (e.g., a 5G cell and/or a cell operating using an operating frequency included in FR1 and/or FR2), and the second cell may be a high-band cell (e.g., a 6G cell and/or a cell operating using an operating frequency included FR3, FR4, FR5, the EHF band, and/or a sub-terahertz band).

In some aspects, the first cell and the second cell may be associated with different network nodes. In other aspects, the first cell and the second cell may be associated with at least one common network node. For example, the first network node 605 may be a first RU, a first base station, and/or a first DU. The second network node 610 may be a second RU, a second base station, and/or a second DU. The first network node 605 and the second network node 610 may be associated with the same control entity, such as the same DU and/or the same CU. Alternatively, the first network node 605 and the second network node 610 may be associated with different control entities.

In some aspects, actions described herein as being performed by a network node 110 (or a cell) may be performed by multiple different network nodes. For example, configuration actions may be performed by a first network node (for example, a CU or a DU), and radio communication actions may be performed by a second network node (for example, a DU or an RU). As used herein, a network node 110 "transmitting" a communication to the UE 120 may refer to a direct transmission (e.g., from the network node 110 to the UE 120) or an indirect transmission via one or more other network nodes or devices. For example, if the network node 110 is a DU, an indirect transmission to the UE 120 may include the DU transmitting a communication to an RU and the RU transmitting the communication to the UE 120. Similarly, the UE 120 "transmitting" a communication to the network node 110 may refer to a direct transmission (e.g., from the UE 120 to the network node 110) or an indirect transmission via one or more other network nodes or devices. For example, if the network node 110 is a DU, an indirect transmission to the network node 110 may include the UE 120 transmitting a communication to an RU, and the RU transmitting the communication to the DU. Additionally, the UE 120 receiving a communication from, or transmitting a communication to, a cell may refer to the UE 120 receiving the communication from, or transmitting the communication to, a network node associated with the cell.

In some aspects, the UE 120 may be operating in an RRC connected mode, an RRC idle mode, or an RRC inactive mode. For example, the UE 120 may support a connected communication mode (e.g., an RRC connected mode, which may sometimes be referred to as an RRC active mode), an idle communication mode (e.g., an RRC idle mode), and an inactive communication mode (e.g., an RRC inactive mode). The RRC inactive mode may functionally reside between the RRC connected mode and the RRC idle mode. The UE 120 may transition between different modes based at least in part on various commands and/or communications received from the one or more network nodes 110, such as the first network node 605 and/or the second network node 610. For example, the UE 120 may transition from the RRC connected mode or the RRC inactive mode to the RRC idle mode based at least in part on receiving an RRCRelease communication. As another example, the UE 120 may transition from the RRC connected mode to the RRC inactive mode based at least in part on receiving an RRCRelease with suspendConfig communication. As another example, the UE 120 may transition from the RRC idle mode to the RRC connected mode based at least in part on receiving an RRCSetupRequest communication. As another example, the UE 120 may transition from the RRC inactive mode to the RRC connected mode based at least in part on receiving an RRCResumeRequest communication. When transitioning to the RRC inactive mode, the UE 120 and/or the one or more network nodes 110 may store a UE context (e.g., an access stratum (AS) context and/or higher-layer configurations). This permits the UE 120 and/or the one or more network nodes 110 to apply the stored UE context when the UE transitions from the RRC inactive mode to the RRC connected mode in order to resume communications with the one or more network nodes 110, which reduces latency of transitioning to RRC connected mode relative to transitioning to the RRC connected mode from the RRC idle mode.

In some aspects, the UE 120 may transmit, and the first network node 605 and/or the second network node 610 may receive, a capability report. The capability report may indicate that the UE 120 supports performing initial access procedures with an anchor cell (e.g., a low-band anchor cell) to connect with a target cell (e.g., a high-band cell). For example, the UE 120 may transmit an indication that the UE 120 supports performing RACH procedures with low-band anchoring cells to facilitate establishing connections with high-band cells, as described in more detail elsewhere herein.

In some aspects, the first network node 605 or the second network node 610 may transmit, and the UE 120 may receive, configuration information. In some aspects, the UE 120 may receive the configuration information via one or more of system information signaling, RRC signaling, one or more MAC control elements (MAC-CEs), and/or DCI, among other examples. In some aspects, the configuration information may include an indication of one or more configuration parameters (e.g., already stored by the UE 120 and/or previously indicated by the network node 110 or other network device) for selection by the UE 120, and/or explicit configuration information for the UE 120 to use to configure itself, among other examples. In some aspects, the configuration information may indicate that the UE 120 is to connect with high-band cells (such as the second cell) via a low-band anchoring cell (such as the first cell).

For example, as shown by reference number 615, the first network node 605 (e.g., the first cell) may transmit, and the UE 120 may receive, one or more system information communications. For example, the one or more system information communications may include one or more SIBs. In some aspects, the one or more system information communications may include a master information block (MIB). In some aspects, the one or more system information communications may include an indication that the first network node 605 and/or the first cell supports initial access procedures for facilitating the establishment of a connection with one or more other cells (e.g., the second cell or other high-band cells).

For example, the one or more system information communications may include an indication of one or more cells (e.g., target cells or candidate cells) that are associated with the first cell (e.g., an anchor cell). For example, the first network node 605 and/or the first cell may indicate (e.g., in the one or more system information communications) one or more cells (e.g., including the second cell) for which the first cell provides support for initial access and/or RACH procedures, as described herein. For example, in system information associated with the first cell, the first network node 605 may indicate identifiers (e.g., a physical cell identifier (PCI) or another identifier) of the one or more cells for which the first cell provides support for initial access and/or RACH procedures. The first network node 605 may broadcast the system information (e.g., including an indication of the identifiers of the one or more cells) in one or more SIBs.

In some aspects, the one or more system information communications may include an initial access configuration associated with the first cell. For example, the initial access configuration may include one or more RACH configurations and/or one or more PRACH configurations. For example, the UE 120 may receive, and the first network node 605 (or the first cell) may transmit, an indication of the initial access configuration associated with the first cell. In some aspects, the one or more system information communications may include an initial access configuration (e.g., for initial access procedures performed with the first cell) that is associated with the one or more cells (e.g., such as the second cell). In some aspects, the indication of the initial access configuration(s) associated with the one or more cells may be included in another communication, such as an RRC communication (e.g., if the UE 120 is operating in an RRC connected mode or an RRC inactive mode with the first network node 605). In some aspects, the one or more system information communications may include an indication of different PRACH configurations for the one or more cells (e.g., one or more target cells or candidate cells for the UE 120).

In some aspects, the different PRACH configurations may be associated with the same time domain resources and different frequency domain resources. For example, the different PRACH configurations may be associated with the same time domain RACH occasions, but different frequency domain subcarriers or subbands. As used herein, a RACH "occasion" may refer to time domain resources used by the UE 120 to transmit a communication during a RACH procedure, such as a msgA or a msg1. For example, an initial access configuration may configure one or more RACH occasions that are available to be used by the UE 120 to initiate a RACH procedure. Additionally, or alternatively, the different PRACH configurations may be associated with different time domain resources and the same frequency domain resources. For example, the different PRACH configurations may be associated with the same frequency domain subcarriers or subbands, but different time domain RACH occasions. Additionally, or alternatively, the different PRACH configurations may be associated with different time domain resources and different frequency domain resources (e.g., different time domain RACH occasions and different frequency domain subcarriers or subbands).

In some aspects, a PRACH configuration associated with a given cell (e.g., the second cell) indicated by the one or more system information communications or another communication transmitted via the first cell may include resources (e.g., spatial domain resources (e.g., beams), time domain resources and/or frequency domain resources) that are partitioned and/or mapped to be associated with different beams of the given cell. For example, the PRACH configuration (e.g., indicated by the one or more system information communications or other communications transmitted via the first cell) associated with the second cell may indicate that different time domain resources (e.g., different time domain RACH occasions) and/or different frequency domain resources (e.g., different frequency domain subcarriers or subbands) are associated with different beam indices of the second cell. For example, the PRACH configuration (e.g., indicated by the one or more system information communications or other communication transmitted via the first cell) associated with the second cell may indicate that a first time domain RACH occasion is associated with a first beam index of the second cell, a second time domain RACH occasion is associated with a second beam index of the second cell, a third time domain RACH occasion is associated with a third beam index of the second cell, and so on. As another example, the PRACH configuration (e.g., indicated by the one or more system information communications or other communications transmitted via the first cell) associated with the second cell may indicate that a first frequency domain subcarrier is associated with a first beam index of the second cell, a second frequency domain subcarrier is associated with a second beam index of the second cell, a third frequency domain subcarrier is associated with a third beam index of the second cell, and so on. Additionally, or alternatively, a combination of a time domain RACH occasion and a frequency domain subcarrier may be mapped to a given beam index.

In other aspects, the UE 120 may receive, and the first network node 605 (or the first cell) may transmit, an indication of a single initial access configuration (e.g., a single PRACH configuration) that is associated with the one or more cells (e.g., and the first cell). For example, the PRACH configuration may indicate RACH resources (e.g., time domain RACH occasions, one or more frequency domain resources, and/or PRACH preambles) associated with respective cells from the one or more cells (e.g., for which the first cell supports initial access). For example, the first network node 605 and/or the first cell may partition RACH resources to enable the UE 120 to indicate a target cell and/or a target beam index based at least in part on the particular RACH resources used by the UE 120 as part of the initial access procedure with the first cell.

The first network node 605 and/or the first cell may determine the one or more cells (e.g., for which the first cell supports initial access, as described herein). For example, the first network node 605 and/or the first cell may determine the one or more cells based at least in part on a configuration stored by the first network node 605. Additionally, or alternatively, the first network node 605 and/or the first cell may communicate with the one or more cells to enable the first network node 605 to determine the one or more cells. For example, the first network node 605 and the second network node 610 may communicate (e.g., via an Xn interface, a backhaul interface, or a midhaul interface) to indicate that the first cell is to support initial access to enables UEs to connect with the second cell. As another example, the first network node 605 and/or the first cell may receive an indication of the one or more cells (e.g., from a control entity, a DU, a CU, or a core network device). The first network node 605 and/or the first cell may determine the one or more cells based at least in part on receiving the indication of the one or more cells.

In some aspects, the one or more system information communications received by the UE 120 via the first cell may include an indication of system information associated with the one or more cells (e.g., for which the first cell supports initial access, as described herein). For example, the one or more system information communications received by the UE 120 via the first cell may include an indication of system information associated with the second cell. In other words, an anchor cell may broadcast system information of one or more cells that the anchor cell supports for initial access, as described herein. In some aspects, the system information associated with a cell of the one or more cells (e.g., for which the first cell supports initial access, as described herein) may include an indication of one or more anchor cells (e.g., including the first cell) associated with the cell. For example, the system information may include an indication of anchor cells that support initial access for the cell.

In some aspects, as shown by reference number 620, the UE 120 may receive, and the second network node 610 (and/or the second cell) may transmit one or more system information communications. For example, the one or more system information communications may include one or more SIBs. In some aspects, the one or more system information communications may include an MIB. In some aspects, the one or more system information communications may include an indication of one or more anchor cells associated with the second cell. For example, as described above, the second cell may be a target cell or a candidate cell for the UE 120 where initial access to the second cell is supported via one or more anchor cells (such as the first cell).

For example, the one or more system information communications received by the UE 120 via the second cell may include an indication of one or more cells (e.g., anchor cells) that are associated with the second cell. For example, the second network node 610 and/or the second cell may indicate (e.g., in the one or more system information communications) one or more cells (e.g., including the first cell) that provide support for initial access and/or RACH procedures for the second cell, as described herein. For example, in system information associated with the second cell, the second network node 610 may indicate identifiers (e.g., a PCI or another identifier) of the one or more cells that provide support for initial access and/or RACH procedures for the second cell. The second network node 610 may broadcast the system information (e.g., including an indication of the identifiers of the one or more cells) in one or more SIBs. Alternatively, if the system information associated with the second cell is broadcast via the first cell (e.g., as described in more detail above), the UE 120 may not receive, and/or the second network node 610 may not transmit, the system information associated with the second cell.

As shown by reference number 625, the UE 120 may determine a target cell and/or a target beam index for a communication connection and/or a communication link. For example, the UE 120 may determine or select a high-band cell for a communication connection and/or a communication link. The UE 120 may determine the target cell based at least in part on one or more measurements of candidate cells (such as the second cell). For example, the UE 120 may measure one or more candidate cells. The UE 120 may identify one or more candidate cells associated with a measurement value that satisfies a threshold. Additionally, or alternatively, the UE 120 may determine the target cell based at least in part on the target cell being associated with a highest measurement value among measurement values of the one or more candidate cells. For example, the UE 120 may determine that the target cell is the second cell.

The UE 120 may determine the target beam index based at least in part on performing one or more measurements associated with the second cell (e.g., the target cell). In other words, the UE 120 may determine a beam associated with the target cell (e.g., the second cell) that will be used for a communication link after the UE 120 performs the initial access procedure with an anchor cell. For example, the UE 120 may measure reference signals (e.g., SSBs) transmitted by the second network node 610 and/or the second cell. A reference signal (e.g., an SSB) may be associated with a beam and/or a beam index. For example, the UE 120 may select a beam associated with the second cell based at least in part on measurements (e.g., RSRP measurements) of one or more SSBs being above a configured threshold. If no such SSBs are available, then the UE 120 may select any beam index associated with the second cell.

As shown by reference number 630, the UE 120 may determine an anchor cell to be used for initial access with the target cell (e.g., with the second cell). For example, as described above, the UE 120 may receive an indication of one or more anchor cells (e.g., including the first cell) that support initial access procedures for establishing a connection with the target cell selected by the UE 120 (e.g., the second cell). The UE 120 may determine and/or select an anchor cell, from the one or more anchor cells, to be associated with the initial access procedure. For example, the UE 120 may determine and/or select the anchor cell based at least in part on measurements (e.g., Layer 3 (L3) RSRP measurements) associated with the one or more anchor cells. In other words, the UE 120 may evaluate a signal strength of the one or more anchor cells associated with the selected target cell (e.g., associated with the second cell). For example, the UE 120 may perform the measurements associated with the one or more anchor cells (e.g., during a cell reselection procedure and/or radio resource management (RRM) measurements for the cell reselection procedure). For example, the UE 120 may select a cell, from the one or more anchor cells, that is associated with a highest measurement value. For example, the UE 120 may select the first cell as the anchor cell for establishing a connection with the second cell.

The UE 120 may determine an initial access configuration to be used for establishing the connection with the second cell (e.g., via the first cell) based at least in part on the selected anchor cell, the selected target cell, and/or the selected target beam index. For example, the UE 120 may identify an initial access configuration associated with the selected anchor cell (e.g., the first cell). In some aspects, the UE 120 may identify an initial access configuration (e.g., a PRACH configuration) and/or resources (e.g., a time domain RACH occasion and/or a frequency domain subcarrier) of the initial access configuration that is associated with the selected target cell and/or the selected target beam index. For example, a PRACH configuration and/or RACH resources of a PRACH configuration may be associated with the selected target cell and/or the selected target beam index (e.g., as indicated via the first cell, as described in more detail above). Therefore, the UE 120 may select the PRACH configuration and/or the RACH resources of the PRACH configuration to indicate to the first network node 605 and/or the first cell that the target cell (e.g., the second cell) and/or that the target beam index have been selected by the UE 120.

As shown by reference number 635, the UE 120 and the first network node 605 (e.g., and the first cell) may perform an initial access procedure. The initial access procedure may be a random access procedure. For example, the initial access procedure may be a two-step RACH procedure (e.g., as depicted and described in more detail in connection with FIG. 4) or a four-step RACH procedure (e.g., as depicted and described in more detail in connection with FIG. 5). In some aspects, the UE 120 may transmit, and the first network node 605 (and/or the first cell) may receive, an indication of the target cell (e.g., the second cell) and an indication of the target beam index associated with the target cell as part of the initial access procedure with the second cell (e.g., the anchor cell for the second cell).

In some aspects, the indication of the target cell and/or the indication of the target beam index may be based at least in part on PRACH resources (e.g., time domain resources, frequency domain resources, and/or spatial domain resources) used by the UE 120 to perform the initial access procedure with the first cell. For example, as described above, the UE 120 may receive different PRACH configurations (e.g., associated with the first cell) for one or more cells (e.g., including the second cell) for which the first cell supports initial access. The indication of the second cell and/or the indication of the target beam index may be based at least in part on using a PRACH configuration, from the different PRACH configurations, that is associated with the second cell. In other words, the UE 120 may indicate the target cell (e.g., the second cell) and/or the target beam index through the use of different PRACH resources and/or different PRACH configurations.

For example, the first network node 605 and/or the first cell may configure an initial access configuration (e.g., a PRACH configuration) that is available to be used for the initial access procedure with the first cell and that is mapped to, or associated with, the second cell. The initial access configuration (e.g., the PRACH configuration) may be associated with time domain RACH occasions and/or frequency domain sub carriers that are different than other initial access configurations (e.g., other PRACH configurations) that are available to be used for the initial access procedure with the first cell (e.g., and that are mapped to, or associated with, other cells). The UE 120 may transmit RACH communication(s) (e.g., a msgA or a msg1) using a time domain RACH occasion and/or a frequency domain subcarrier that is indicated by the initial access configuration (e.g., the PRACH configuration) that is available to be used for the initial access procedure with the first cell and that is mapped to, or associated with, the second cell. As a result, the first network node 605 and/or the first cell may determine that the UE 120 is performing the initial access procedure with the first cell for the purpose of establishing a connection with the second cell.

In some aspects, the initial access configuration (e.g., the PRACH configuration) that is available to be used for the initial access procedure with the first cell and that is mapped to, or associated with, the second cell may include PRACH resources (or RACH resources) that are associated with, or mapped to, different beam indices of the second cell. For example, a first time domain RACH occasion may be associated with a first beam index, a second time domain RACH occasion may be associated with a second beam index, a third time domain RACH occasion may be associated with a third beam index, and so on. As another example, first frequency domain resources may be associated with a first beam index, second frequency domain resources may be associated with a second beam index, third frequency domain resources may be associated with a third beam index, and so on. As another example, a combination of a time domain RACH occasion and frequency domain resources may be associated with, or mapped to, a particular beam index. The UE 120 may use time domain resources (e.g., a RACH occasion) and/or frequency domain resources to transmit RACH communication(s) (e.g., a msgA communication or a msg1 communication) that are associated with, or mapped to, the target beam index.

In other words, the indication of the target cell (e.g., the second cell) may be based at least in part on using resources associated with a particular PRACH configuration, and the indication of the target beam index may be based at least in part on a time domain resource and/or a frequency domain resource, associated with the PRACH configuration, that is used by the UE 120 for the initial access procedure. As a result, the first network node 605 and/or the first cell may determine that the UE 120 is performing the initial access procedure with the first cell for the purpose of establishing a connection with the second cell and that the UE 120 has selected the target beam index as a beam to be used to communicate with the second cell.

As another example, the UE 120 may be configured with a single initial access configuration (e.g., a single PRACH configuration) for the first cell. In such example, the single initial access configuration may include (P)RACH resources that are associated with, or mapped to, different cells (e.g., target cells) and/or beam indices. For example, wherein a PRACH configuration associated with the first cell may indicate RACH resources associated with respective target cells (e.g., including the second cell). The indication of the second cell and/or the indication of the target beam index may be based at least in part on using a RACH resource, from the RACH resources, that is associated with the second cell. For example, the RACH resources may include a time domain RACH occasion, one or more frequency domain resources, and/or a preamble (e.g., a RAM preamble or a PRACH preamble).

For example, RACH resources may be partitioned (e.g., by the first network node 605) between various cells (e.g., target cells) and/or beam indices of the various cells. For example, a set of RACH resources to be used with the first cell may be associated with the second cell. The set of RACH resources may be divided such that a RACH resource (e.g., a RACH occasion, a frequency domain resource, and/or a preamble), from the set of RACH resources, is associated with, or mapped to, a given beam index associated with the second cell. As described above, the mapping and/or associated with RACH resources to respective cells and/or beam indices may be indicated via the system information associated with the first cell. Therefore, the indication of the second cell and/or the indication of the target beam index may be based at least in part on using a RACH resource, from the RACH resources configured by the single initial access configuration associated with the first cell, that is associated with the second cell and/or the target beam index.

As another example, the indication of the second cell and/or the indication of the target beam index may be included in a communication associated with the initial access procedure. In other words, the UE 120 may explicitly indicate the second cell and/or the target beam index may be included in a communication associated with the initial access procedure. The communication may be a control channel communication (e.g., a physical uplink control channel (PUCCH) communication or a common control channel (CCCH) communication). Additionally, or alternatively, the communication may be a msgA communication or a msg3 communication. In some aspects, the communication may be the third message in a four-step random access procedure or may be included in a PUSCH payload in a first message in a two-step random access procedure. For example, the UE 120 may include a PCI associated with the second cell and/or the target beam index in the communication associated with the initial access procedure. As a result, the first network node 605 and/or the first cell may determine that the UE 120 is performing the initial access procedure with the first cell for the purpose of establishing a connection with the second cell and that the UE 120 has selected the target beam index as a beam to be used to communicate with the second cell.

In some aspects, the indication of the second cell (e.g., the target cell) may be based at least in part on PRACH resources and/or a PRACH configuration used by the UE 120 to perform the initial access procedure with the first cell (e.g., in a similar manner as described above), and the indication of the target beam index may be included in the communication. In other words, the indication of the second cell may be an implicit indication (e.g., based at least in part on the PRACH resources and/or a PRACH configuration used by the UE 120), and the indication of the target beam index may be an explicit indication (e.g., included in a communication, such as a msg3 communication or a msgA communication). As another example, the indication of the target beam index may be an implicit indication (e.g., based at least in part on the PRACH resources and/or a PRACH configuration used by the UE 120), and the indication of the second cell may be an explicit indication (e.g., a PCI of the second cell may be included in a communication, such as a msg3 communication or a msgA communication). As another example, the indication of the second cell may be an implicit indication that is based at least in part on a PRACH configuration used by the UE 120 to perform the initial access procedure, and the indication of the target beam index may be an implicit indication that is based at least in part on RACH resources, associated with the PRACH configuration, that are used by the UE 120 to perform the initial access procedure.

The UE 120 and the first network node 605 (and/or the first cell) may perform the initial access procedure via the first cell (e.g., using an operating frequency and/or other communication parameters associated with the first cell). For example, the UE 120 and the first network node 605 (and/or the first cell) may perform a two-step RACH procedure (e.g., as depicted and described in more detail in connection with FIG. 4) or a four-step RACH procedure (e.g., as depicted and described in more detail in connection with FIG. 5) using an operating frequency and/or other communication parameters associated with the first cell. This may reduce complexity and/or improve reliability associated with performing the initial access procedure (e.g., because the UE 120 may not be required to tune or re-tune RF components of the UE 120 between a frequency band associated with the first cell and a frequency band associated with the second cell while performing the initial access procedure).

For example, the initial access procedure is performed with the anchor cell using a temporary cell radio network temporary identifier (C-RNTI). The temporary C-RNTI may be indicated to the UE 120 in a msg2 or a msgB of the initial access procedure. The UE 120 may use the temporary C-RNTI when communicating with the first cell. The UE 120 may indicate a contention resolution identifier in a msg3 or a msgA of the initial access procedure. The initial access procedure may be successful if the UE 120 receives (e.g., from the first network node 605 and/or the first cell) a msg4 or a msgB that is addressed to the temporary C-RNTI and that includes the contention resolution identifier.

As shown by reference number 640, the first network node 605 may transmit, and the UE 120 may receive, an indication to switch a connection from the first cell to the second cell (e.g., the target cell). In some aspects, the indication may be included in a communication after the resolution of the initial access procedure (e.g., in a msg5 or a msgC), such as when the UE 120 is operating in an RRC idle mode or an RRC inactive mode. In other examples, the indication may be included in a communication associated with the initial access procedure (e.g., a msg4 or a msgB), such as when the UE 120 is operating in an RRC connected mode. For example, the first network node 605 and/or the first cell may determine that the UE 120 is performing the initial access procedure to connect with the second cell. The first network node 605 and/or the first cell may obtain information (e.g., configuration information and/or system information) associated with the second cell. The first network node 605 and/or the first cell may cause the UE 120 to connect with the second cell based at least in part on determining that the UE 120 is performing the initial access procedure with the first cell to connect with the second cell, as described in more detail elsewhere herein.

The indication to switch a connection from the first cell to the second cell (e.g., the target cell) may include system information associated with the second cell. For example, the UE 120 may receive, and the first network node 605 (and/or the first cell) may transmit, a handover command communication based on performing (e.g., successfully) the initial access procedure. The handover command communication may include system information associated with the target cell (e.g., the second cell). Additionally, or alternatively, the handover command communication may include a C-RNTI allocated by the second cell for the UE 120. For example, the second network node 610 (and/or the second cell) may transmit, and the first network node 605 (and/or the first cell) may receive, an indication of the C-RNTI allocated by the second cell (and/or the second network node 610) for the UE 120. The first network node 605 (and/or the first cell) may include an indication of the C-RNTI in the handover command transmitted to the UE 120. Additionally, or alternatively, the handover command communication may include an indication that the UE is to establish the connection with the target cell (e.g., the second cell). For example, the handover command communication may be an indication to the UE 120 to tune (or retune) RF components of the UE 120 to an operating frequency or a frequency band associated with the second cell (e.g., to tune to the target cell).

In some other examples, the UE 120 may obtain system information associated with the second cell prior to performing the initial access procedure. For example, as described elsewhere herein, in some cases the first network node 605 and/or the first cell may transmit the system information associated with the second cell. In such examples, the UE 120 may receive, and the first network node 605 (and/or the first cell) may transmit, a MAC-CE communication (e.g., a C-RNTI MAC-CE) indicating a C-RNTI allocated for the UE 120 for the target cell and that the UE is to establish the connection with the target cell. The MAC-CE communication may indicate to the UE 120 to switch the connection to the second cell (e.g., to tune (or retune) RF components of the UE 120 to an operating frequency or a frequency band associated with the second cell).

As shown by reference number 645, the UE 120 may establish a connection with the second cell. For example, the UE 120 may establish a connection with a target cell (e.g., the second cell) based at least in part on performing the initial access procedure with the anchor cell (e.g., the first cell). The UE 120 may establish the connection using a beam indicated by the target beam index. The UE 120 may establish the connection using the C-RNTI allocated by the second cell (e.g., an indicated to the UE 120 via the first cell).

In some aspects, the second network node 610 and/or the second cell may schedule a PDCCH order for the UE 120 to enable the second network node 610 and/or the second cell to obtain uplink timing for the UE 120 and the second cell. For example, the UE 120 may receive, and the second network node 610 (and/or the second cell) may transmit, a downlink control channel (e.g., a PDCCH) order for performing a contention-free random access procedure with the target cell (e.g., with the second cell). The contention-free random access procedure may enable the second network node 610 and/or the second cell to obtain uplink timing associated with the UE 120. The UE 120 may establish an RRC connection with the second cell (e.g., the target cell) based at least in part on performing the contention-free random access procedure. For example, the network (e.g., the second network node 610 and/or the second cell) may perform an RRC connection establishment procedure with the UE 120 (e.g., if the UE 120 is operating in the RRC idle mode or the RRC inactive mode). For example, the UE 120 may receive, and the second network node 610 (and/or the second cell) may transmit, an RRCConnectionEstablishment communication (e.g., if the UE 120 is operating in the RRC idle mode) or an RRCResume communication (e.g., if the UE 120 is operating in the RRC inactive mode). No RRC connection establishment may be performed between the UE 120, and the second network node 610 (and/or the second cell) if the UE 120 is operating in the RRC connected mode prior to performing the initial access procedure with the first cell.

As a result, a reliability and/or a likelihood of success of initial access procedures for connecting to high-band cells may be improved. For example, the anchor cell (e.g., the first cell and/or the low-band cell) may be associated with better coverage and/or higher reliability as compared to a target cell (e.g., the second cell and/or a high-band cell). Therefore, by enabling the UE 120 to perform the initial access procedure (e.g., a RACH procedure) with the anchor cell (e.g., with the first cell) and then be handed over to the target cell (e.g., to the second cell and/or the high-band cell), a reliability and/or a likelihood of success of initial access procedure may be improved (e.g., compared to if the UE 120 were to perform the initial access procedure directly with the second cell). This may enable the UE 120 to establish a connection with the second cell, thereby improving throughput and/or data rates of communications associated with the UE 120 (e.g., because the UE 120 is enabled to establish a connection with a high-band cell that is associated with a larger bandwidth and/or throughput). Additionally, because each target cell (e.g., each high-band cell) may not be associated with separate initial access configurations (e.g., separate PRACH configurations), a resource allocation overhead associated with initial access procedures in a wireless network (e.g., that includes both high-band cells and low-band cells) may be reduced.

As indicated above, FIG. 6 is provided as an example. Other examples may differ from what is described with regard to FIG. 6.

Figure 7:
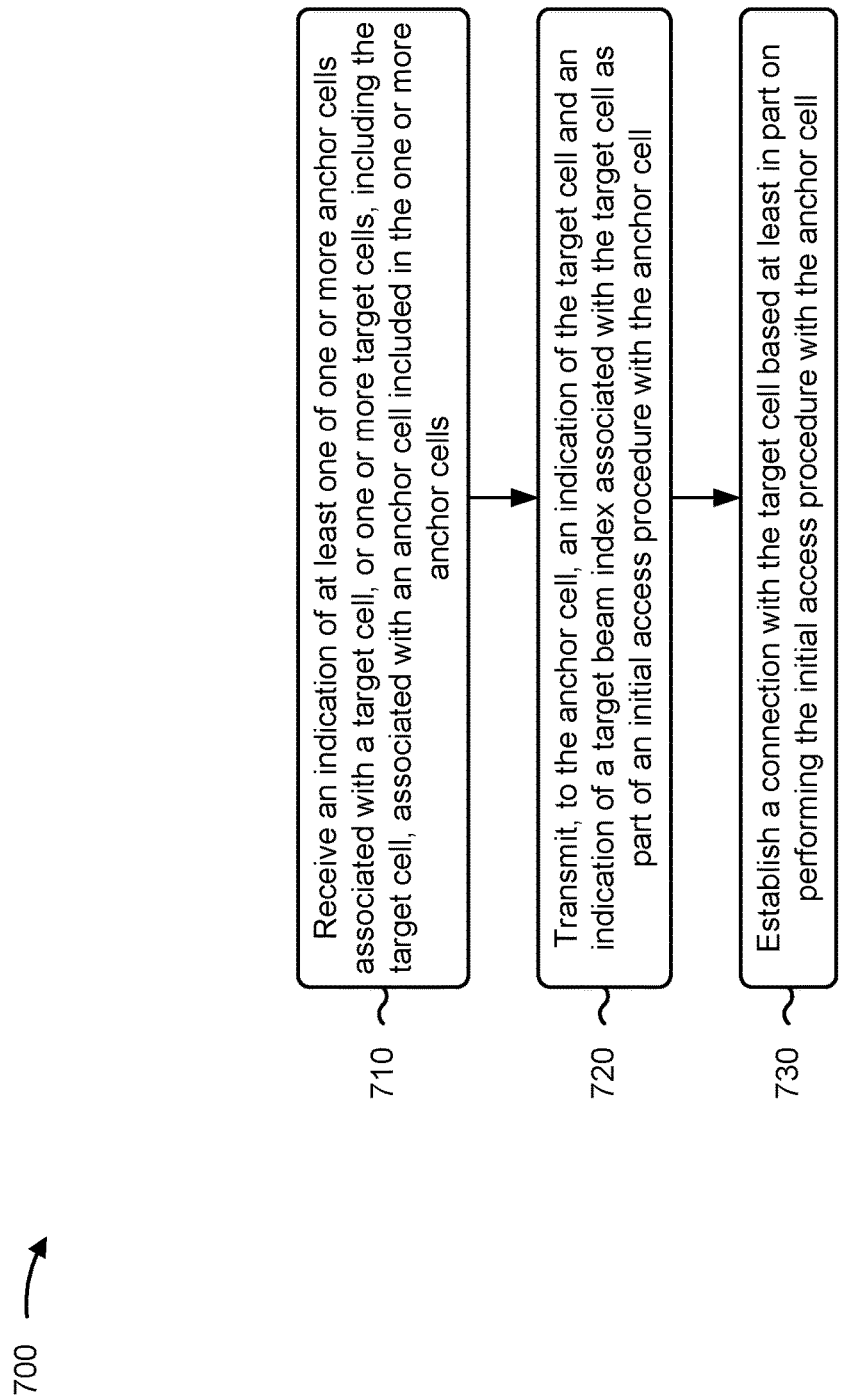
FIG. 7 is a diagram illustrating an example process performed, for example, by a UE, in accordance with the present disclosure.

FIG. 7 is a diagram illustrating an example process 700 performed, for example, by a UE, in accordance with the present disclosure. Example process 700 is an example where the UE (e.g., UE 120) performs operations associated with initial access enhancements for network deployments.

As shown in FIG. 7, in some aspects, process 700 may include receiving an indication of at least one of: one or more anchor cells associated with a target cell, or one or more target cells, including the target cell, associated with an anchor cell included in the one or more anchor cells (block 710). For example, the UE (e.g., using communication manager 140 and/or reception component 902, depicted in FIG. 9) may receive an indication of at least one of: one or more anchor cells associated with a target cell, or one or more target cells, including the target cell, associated with an anchor cell included in the one or more anchor cells, as described above.

As further shown in FIG. 7, in some aspects, process 700 may include transmitting, to the anchor cell, an indication of the target cell and an indication of a target beam index associated with the target cell as part of an initial access procedure with the anchor cell (block 720). For example, the UE (e.g., using communication manager 140 and/or transmission component 904, depicted in FIG. 9) may transmit, to the anchor cell, an indication of the target cell and an indication of a target beam index associated with the target cell as part of an initial access procedure with the anchor cell, as described above.

As further shown in FIG. 7, in some aspects, process 700 may include establishing a connection with the target cell based at least in part on performing the initial access procedure with the anchor cell (block 730). For example, the UE (e.g., using communication manager 140 and/or the connection establishment component 908, depicted in FIG. 9) may establish a connection with the target cell based at least in part on performing the initial access procedure with the anchor cell, as described above.

Process 700 may include additional aspects, such as any single aspect or any combination of aspects described below and/or in connection with one or more other processes described elsewhere herein.

In a first aspect, the one or more anchor cells are associated with a first operating frequency range, and wherein the one or more target cells are associated with a second operating frequency range.

In a second aspect, alone or in combination with the first aspect, at least one of the indication of the target cell or the indication of the target beam index is based at least in part on PRACH resources used by the UE to perform the initial access procedure with the anchor cell.

In a third aspect, alone or in combination with one or more of the first and second aspects, process 700 includes receiving, from the anchor cell, different PRACH configurations for the one or more target cells, and wherein at least one of the indication of the target cell or the indication of the target beam index is based at least in part on using a PRACH configuration, from the different PRACH configurations, that is associated with the target cell.

In a fourth aspect, alone or in combination with one or more of the first through third aspects, the different PRACH configurations are associated with at least one of same time domain resources and different frequency domain resources, different time domain resources and same frequency domain resources, or different time domain resources and different frequency domain resources.

In a fifth aspect, alone or in combination with one or more of the first through fourth aspects, the indication of the target cell is based at least in part on using the PRACH configuration, and wherein the indication of the target beam index is based at least in part on at least one of a time domain resource or a frequency domain resource, associated with the PRACH configuration, that is used for the initial access procedure.

In a sixth aspect, alone or in combination with one or more of the first through fifth aspects, process 700 includes receiving, from the anchor cell, a PRACH configuration for the one or more target cells, wherein the PRACH configuration indicates RACH resources associated with respective target cells from the one or more target cells, and wherein at least one of the indication of the target cell or the indication of the target beam index is based at least in part on using a RACH resource, from the RACH resources, that is associated with the target cell.

In a seventh aspect, alone or in combination with one or more of the first through sixth aspects, the RACH resource includes at least one of a time domain RACH occasion, one or more frequency domain resources, or a preamble.

In an eighth aspect, alone or in combination with one or more of the first through seventh aspects, at least one of the indication of the target cell or the indication of the target beam index is included in a communication associated with the initial access procedure.

In a ninth aspect, alone or in combination with one or more of the first through eighth aspects, the communication is a Msg3 communication, a MsgA communication, a third message in a four-step random access procedure, or is included in a shared channel payload in a first message in a two-step random access procedure.

In a tenth aspect, alone or in combination with one or more of the first through ninth aspects, the indication of the target cell is based at least in part on PRACH resources used by the UE to perform the initial access procedure with the anchor cell, and wherein the indication of the target beam index is included in the communication.

In an eleventh aspect, alone or in combination with one or more of the first through tenth aspects, the initial access procedure is performed with the anchor cell using a temporary C-RNTI.

In a twelfth aspect, alone or in combination with one or more of the first through eleventh aspects, process 700 includes receiving, from the anchor cell and based on performing the initial access procedure, a handover command communication that indicates information associated with the target cell, a C-RNTI associated with the target cell, and that the UE is to establish the connection with the target cell.

In a thirteenth aspect, alone or in combination with one or more of the first through twelfth aspects, the UE obtains system information associated with the target cell prior to performing the initial access procedure with the anchor cell, the method further comprising receiving, from the anchor cell, a C-RNTI MAC-CE communication indicating a C-RNTI allocated for the UE for the target cell and that the UE is to establish the connection with the target cell.

In a fourteenth aspect, alone or in combination with one or more of the first through thirteenth aspects, the C-RNTI MAC-CE communication is included in a Msg5 or a MsgC of the initial access procedure.

In a fifteenth aspect, alone or in combination with one or more of the first through fourteenth aspects, the C-RNTI MAC-CE communication is included in a Msg4 or a MsgB of the initial access procedure.

In a sixteenth aspect, alone or in combination with one or more of the first through fifteenth aspects, establishing the connection with the target cell comprises receiving, from the target cell, a downlink control channel order for performing a contention-free random access procedure with the target cell, and establishing an RRC connection with the target cell based at least in part on performing the contention-free random access procedure.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
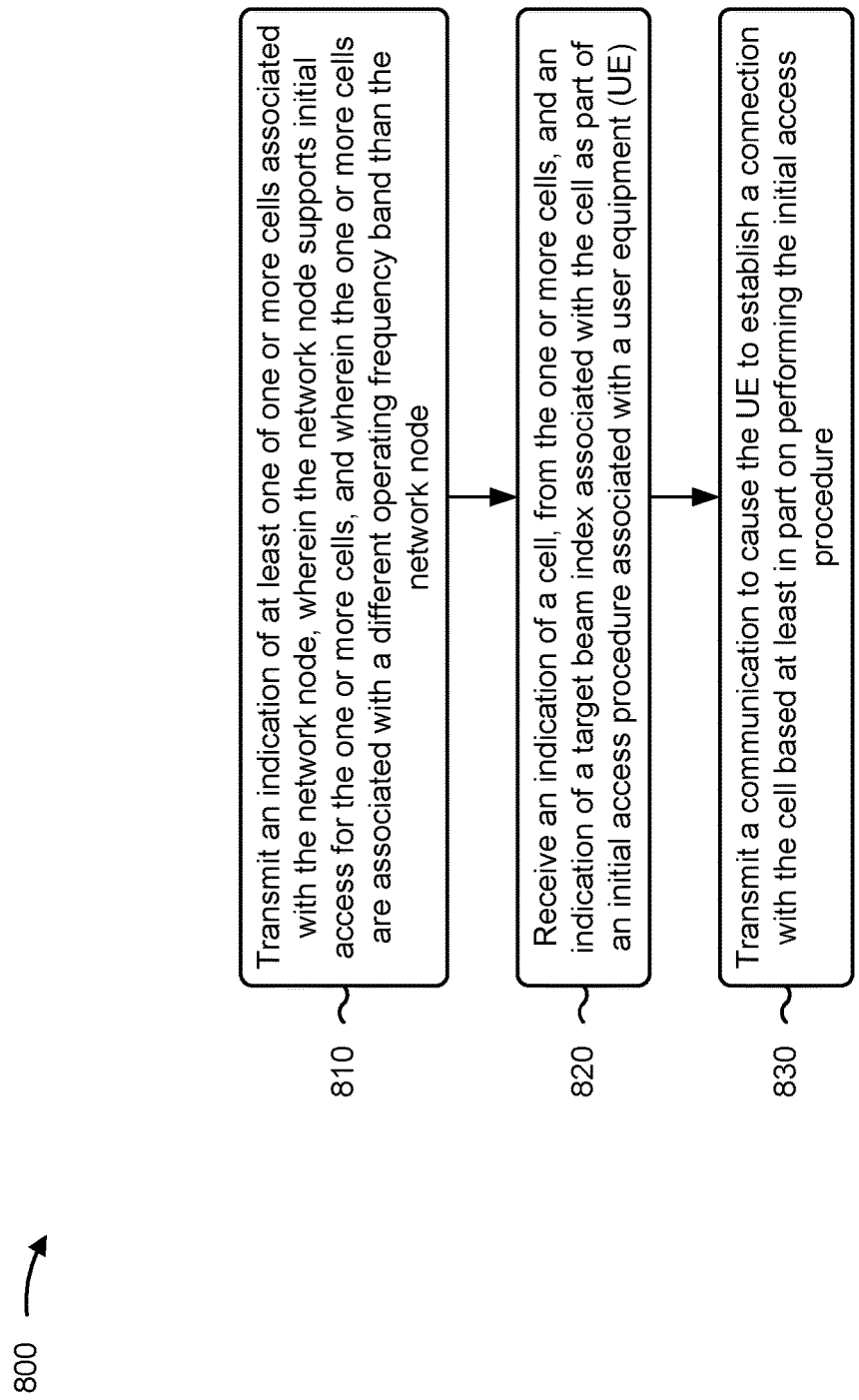
FIG. 8 is a diagram illustrating an example process performed, for example, by a network node, in accordance with the present disclosure.

FIG. 8 is a diagram illustrating an example process 800 performed, for example, by a network node, in accordance with the present disclosure. Example process 800 is an example where the network node (e.g., a network node 110 and/or the first network node 605) performs operations associated with initial access enhancements for network deployments.

As shown in FIG. 8, in some aspects, process 800 may include transmitting an indication of at least one of one or more cells associated with the network node, wherein the network node supports initial access for the one or more cells, and wherein the one or more cells are associated with a different operating frequency band than the network node (block 810). For example, the network node (e.g., using communication manager 150 and/or transmission component 1004, depicted in FIG. 10) may transmit an indication of at least one of one or more cells associated with the network node, wherein the network node supports initial access for the one or more cells, and wherein the one or more cells are associated with a different operating frequency band than the network node, as described above.

As further shown in FIG. 8, in some aspects, process 800 may include receiving an indication of a cell, from the one or more cells, and an indication of a target beam index associated with the cell as part of an initial access procedure associated with a UE (block 820). For example, the network node (e.g., using communication manager 150 and/or reception component 1002, depicted in FIG. 10) may receive an indication of a cell, from the one or more cells, and an indication of a target beam index associated with the cell as part of an initial access procedure associated with a UE, as described above.

As further shown in FIG. 8, in some aspects, process 800 may include transmitting a communication to cause the UE to establish a connection with the cell based at least in part on performing the initial access procedure (block 830). For example, the network node (e.g., using communication manager 150 and/or transmission component 1004, depicted in FIG. 10) may transmit a communication to cause the UE to establish a connection with the cell based at least in part on performing the initial access procedure, as described above.

Process 800 may include additional aspects, such as any single aspect or any combination of aspects described below and/or in connection with one or more other processes described elsewhere herein.

In a first aspect, at least one of the indication of the cell or the indication of the target beam index is based at least in part on PRACH resources used by the UE to perform the initial access procedure with the network node.

In a second aspect, alone or in combination with the first aspect, process 800 includes transmitting different PRACH configurations for the one or more cells, and wherein at least one of the indication of the cell or the indication of the target beam index is based at least in part on the initial access procedure being associated with a PRACH configuration, from the different PRACH configurations, that is associated with the cell.

In a third aspect, alone or in combination with one or more of the first and second aspects, the different PRACH configurations are associated with at least one of same time domain resources and different frequency domain resources, different time domain resources and same frequency domain resources, or different time domain resources and different frequency domain resources.

In a fourth aspect, alone or in combination with one or more of the first through third aspects, the indication of the cell is based at least in part on the initial access procedure being associated with the PRACH configuration, and wherein the indication of the target beam index is based at least in part on at least one of a time domain resource or a frequency domain resource, associated with the PRACH configuration, that is associated with the initial access procedure.

In a fifth aspect, alone or in combination with one or more of the first through fourth aspects, process 800 includes transmitting a PRACH configuration for the one or more cells, wherein the PRACH configuration indicates RACH resources associated with respective cells from the one or more cells, and wherein at least one of the indication of the cell or the indication of the target beam index is based at least in part on the initial access procedure being associated with a RACH resource, from the RACH resources, that is associated with the cell.

In a sixth aspect, alone or in combination with one or more of the first through fifth aspects, the RACH resource includes at least one of a time domain RACH occasion, one or more frequency domain resources, or a preamble.

In a seventh aspect, alone or in combination with one or more of the first through sixth aspects, at least one of the indication of the cell or the indication of the target beam index is included in a communication associated with the initial access procedure.

In an eighth aspect, alone or in combination with one or more of the first through seventh aspects, the communication is a Msg3 communication or a MsgA communication.

In a ninth aspect, alone or in combination with one or more of the first through eighth aspects, the indication of the cell is based at least in part on PRACH resources associated with the initial access procedure, and wherein the indication of the target beam index is included in the communication.

In a tenth aspect, alone or in combination with one or more of the first through ninth aspects, the initial access procedure is performed with the UE using a temporary C-RNTI.

In an eleventh aspect, alone or in combination with one or more of the first through tenth aspects, process 800 includes transmitting, based on performing the initial access procedure, a handover command communication associated with the UE that indicates information associated with the cell, a C-RNTI associated with the cell, and that the UE is to establish the connection with the cell.

In a twelfth aspect, alone or in combination with one or more of the first through eleventh aspects, process 800 includes transmitting a C-RNTI MAC-CE communication, associated with the UE, indicating a C-RNTI allocated for the UE for the cell and that the UE is to establish the connection with the cell.

In a thirteenth aspect, alone or in combination with one or more of the first through twelfth aspects, the C-RNTI MAC-CE communication is included in a Msg5 or a MsgC of the initial access procedure.

In a fourteenth aspect, alone or in combination with one or more of the first through thirteenth aspects, the C-RNTI MAC-CE communication is included in a Msg4 or a MsgB of the initial access procedure.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
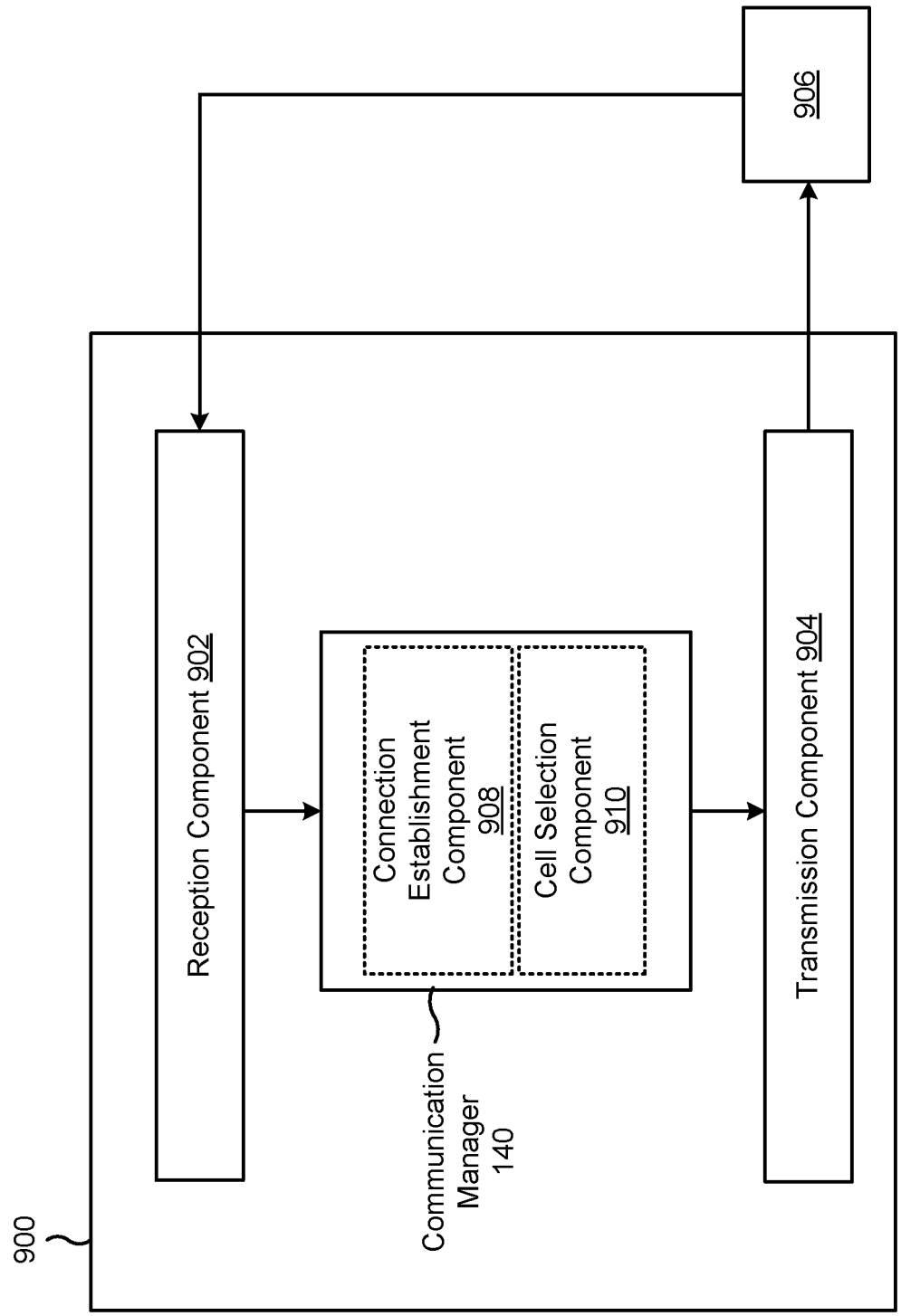
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include one or more of a connection establishment component 908, and/or a cell selection component 910, among other examples.

In some aspects, the apparatus 900 may be configured to perform one or more operations described herein in connection with FIG. 6. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The reception component 902 may receive an indication of at least one of one or more anchor cells associated with a target cell, or one or more target cells, including the target cell, associated with an anchor cell included in the one or more anchor cells. The transmission component 904 may transmit, to the anchor cell, an indication of the target cell and an indication of a target beam index associated with the target cell as part of an initial access procedure with the anchor cell. The connection establishment component 908 may establish a connection with the target cell based at least in part on performing the initial access procedure with the anchor cell.

The cell selection component 910 may determine the target cell based at least in part on measurement values associated with the one or more target cells. The cell selection component 910 may determine the target beam index based at least in part on one or more measurements associated with the target cell.

The reception component 902 may receive, from the anchor cell, different PRACH configurations for the one or more target cells.

The reception component 902 may receive, from the anchor cell, a PRACH configuration for the one or more target cells, wherein the PRACH configuration indicates RACH resources associated with respective target cells from the one or more target cells, and wherein at least one of the indication of the target cell or the indication of the target beam index is based at least in part on using a RACH resource, from the RACH resources, that is associated with the target cell.

The reception component 902 may receive, from the anchor cell and based on performing the initial access procedure, a handover command communication that indicates system information associated with the target cell, a C-RNTI associated with the target cell, and that the UE is to establish the connection with the target cell.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
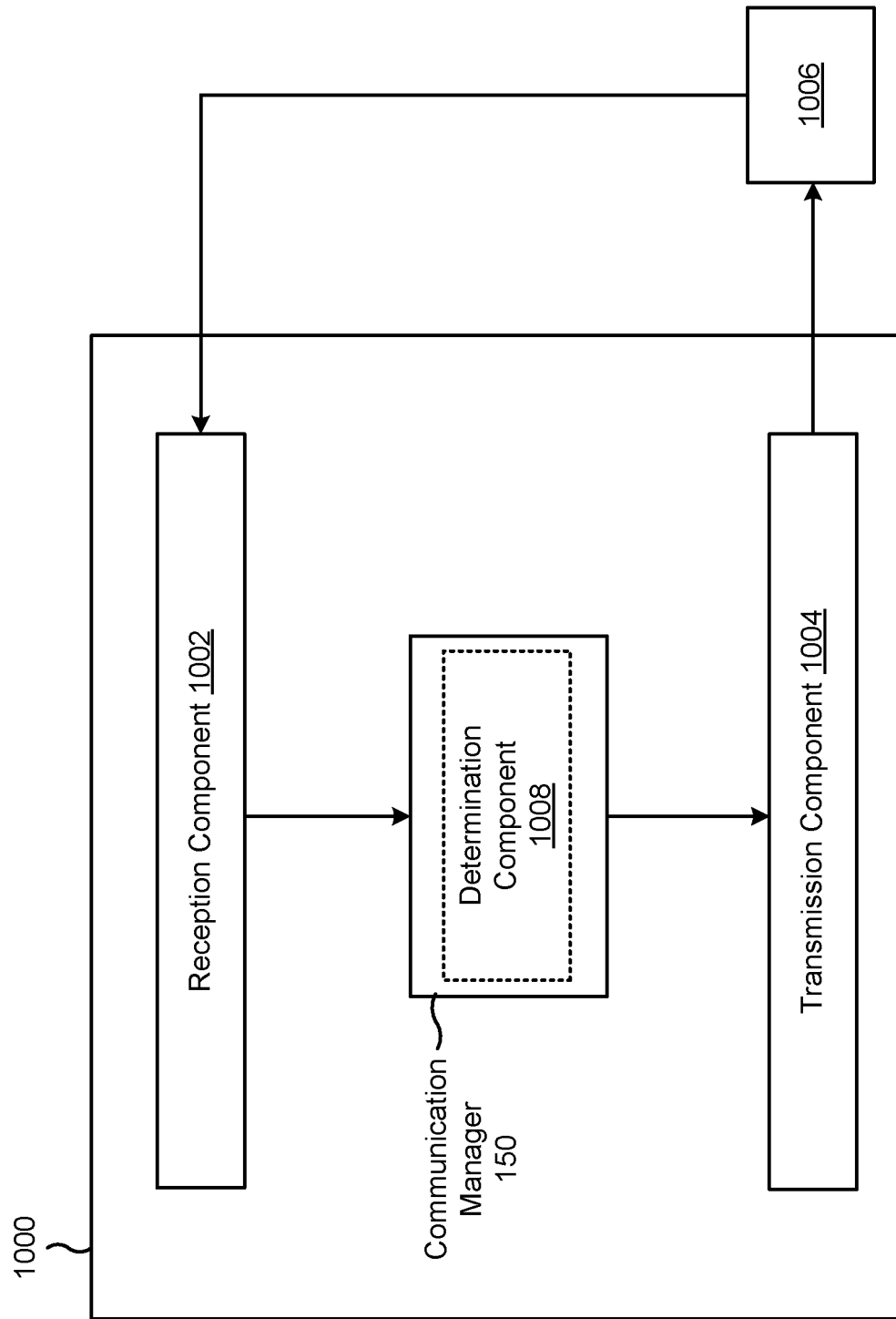
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a network node, or a network node may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150. The communication manager 150 may include a determination component 1008, among other examples.

In some aspects, the apparatus 1000 may be configured to perform one or more operations described herein in connection with FIG. 6. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the network node described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the network node described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the network node described in connection with FIG. 2. In some aspects, the transmission component 1004 may be co-located with the reception component 1002 in a transceiver.

The transmission component 1004 may transmit an indication of at least one of one or more cells associated with the network node, wherein the network node supports initial access for the one or more cells, and wherein the one or more cells are associated with a different operating frequency band than the network node. The reception component 1002 may receive an indication of a cell, from the one or more cells, and an indication of a target beam index associated with the cell as part of an initial access procedure associated with a UE. The transmission component 1004 may transmit a communication to cause the UE to establish a connection with the cell based at least in part on performing the initial access procedure.

The determination component 1008 may determine the cell and/or the target beam index based at least in part on the indication.

The transmission component 1004 may transmit different PRACH configurations for the one or more cells.

The transmission component 1004 may transmit a PRACH configuration for the one or more cells, wherein the PRACH configuration indicates RACH resources associated with respective cells from the one or more cells, and wherein at least one of the indication of the cell or the indication of the target beam index is based at least in part on the initial access procedure being associated with a RACH resource, from the RACH resources, that is associated with the cell.

The transmission component 1004 may transmit, based on performing the initial access procedure, a handover command communication associated with the UE that indicates system information associated with the cell, a C-RNTI associated with the cell, and that the UE is to establish the connection with the cell.

The transmission component 1004 may transmit a C-RNTI MAC-CE communication, associated with the UE, indicating a C-RNTI allocated for the UE for the cell and that the UE is to establish the connection with the cell.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving an indication of at least one of: one or more anchor cells associated with a target cell, or one or more target cells, including the target cell, associated with an anchor cell included in the one or more anchor cells; transmitting, to the anchor cell, an indication of the target cell and an indication of a target beam index associated with the target cell as part of an initial access procedure with the anchor cell; and establishing a connection with the target cell based at least in part on performing the initial access procedure with the anchor cell.

Aspect 2: The method of Aspect 1, wherein the one or more anchor cells are associated with a first operating frequency range, and wherein the one or more target cells are associated with a second operating frequency range.

Aspect 3: The method of any of Aspects 1-2, wherein at least one of the indication of the target cell or the indication of the target beam index is based at least in part on physical random access channel (PRACH) resources used by the UE to perform the initial access procedure with the anchor cell.

Aspect 4: The method of any of Aspects 1-3, further comprising: receiving, from the anchor cell, different physical random access channel (PRACH) configurations for the one or more target cells; and wherein at least one of the indication of the target cell or the indication of the target beam index is based at least in part on using a PRACH configuration, from the different PRACH configurations, that is associated with the target cell.

Aspect 5: The method of Aspect 4, wherein the different PRACH configurations are associated with at least one of: same time domain resources and different frequency domain resources, different time domain resources and same frequency domain resources, or different time domain resources and different frequency domain resources.

Aspect 6: The method of any of Aspects 4-5, wherein the indication of the target cell is based at least in part on using the PRACH configuration, and wherein the indication of the target beam index is based at least in part on at least one of a time domain resource or a frequency domain resource, associated with the PRACH configuration, that is used for the initial access procedure.

Aspect 7: The method of any of Aspects 1-3, further comprising: receiving, from the anchor cell, a physical random access channel (PRACH) configuration for the one or more target cells, wherein the PRACH configuration indicates random access channel (RACH) resources associated with respective target cells from the one or more target cells, and wherein at least one of the indication of the target cell or the indication of the target beam index is based at least in part on using a RACH resource, from the RACH resources, that is associated with the target cell.

Aspect 8: The method of Aspect 7, wherein the RACH resource includes at least one of: a time domain RACH occasion, one or more frequency domain resources, or a preamble.

Aspect 9: The method of any of Aspects 1-8, wherein at least one of the indication of the target cell or the indication of the target beam index is included in a communication associated with the initial access procedure.

Aspect 10: The method of Aspect 9, wherein the communication is a Msg3 communication, a MsgA communication, a third message in a four-step random access procedure, or is included in a shared channel payload in a first message in a two-step random access procedure.

Aspect 11: The method of any of Aspects 9-10, wherein the indication of the target cell is based at least in part on physical random access channel (PRACH) resources used by the UE to perform the initial access procedure with the anchor cell, and wherein the indication of the target beam index is included in the communication.

Aspect 12: The method of any of Aspects 1-11, wherein the initial access procedure is performed with the anchor cell using a temporary cell radio network temporary identifier (C-RNTI).

Aspect 13: The method of any of Aspects 1-12, further comprising: receiving, from the anchor cell and based on performing the initial access procedure, a handover command communication that indicates: system information associated with the target cell, a cell radio network temporary identifier (C-RNTI) associated with the target cell, and that the UE is to establish the connection with the target cell.

Aspect 14: The method of any of Aspects 1-12, where the UE obtains system information associated with the target cell prior to performing the initial access procedure with the anchor cell, the method further comprising: receiving, from the anchor cell, a cell radio network temporary identifier (C-RNTI) medium access control (MAC) control element (MAC-CE) communication indicating a C-RNTI allocated for the UE for the target cell and that the UE is to establish the connection with the target cell.

Aspect 15: The method of Aspect 14, wherein the C-RNTI MAC-CE communication is included in a Msg5 or a MsgC of the initial access procedure.

Aspect 16: The method of Aspect 14, wherein the C-RNTI MAC-CE communication is included in a Msg4 or a MsgB of the initial access procedure.

Aspect 17: The method of any of Aspects 1-16, wherein establishing the connection with the target cell comprises: receiving, from the target cell, a downlink control channel order for performing a contention-free random access procedure with the target cell; and establishing a radio resource control (RRC) connection with the target cell based at least in part on performing the contention-free random access procedure.

Aspect 18: A method of wireless communication performed by a network node, comprising: transmitting an indication of at least one of one or more cells associated with the network node, wherein the network node supports initial access for the one or more cells, and wherein the one or more cells are associated with a different operating frequency band than the network node; receiving an indication of a cell, from the one or more cells, and an indication of a target beam index associated with the cell as part of an initial access procedure associated with a user equipment (UE); and transmitting a communication to cause the UE to establish a connection with the cell based at least in part on performing the initial access procedure.

Aspect 19: The method of Aspect 18, wherein at least one of the indication of the cell or the indication of the target beam index is based at least in part on physical random access channel (PRACH) resources used by the UE to perform the initial access procedure with the network node.

Aspect 20: The method of any of Aspects 18-19, further comprising: transmitting different physical random access channel (PRACH) configurations for the one or more cells; and wherein at least one of the indication of the cell or the indication of the target beam index is based at least in part on the initial access procedure being associated with a PRACH configuration, from the different PRACH configurations, that is associated with the cell.

Aspect 21: The method of Aspect 20, wherein the different PRACH configurations are associated with at least one of: same time domain resources and different frequency domain resources, different time domain resources and same frequency domain resources, or different time domain resources and different frequency domain resources.

Aspect 22: The method of any of Aspects 20-21, wherein the indication of the cell is based at least in part on the initial access procedure being associated with the PRACH configuration, and wherein the indication of the target beam index is based at least in part on at least one of a time domain resource or a frequency domain resource, associated with the PRACH configuration, that is associated with the initial access procedure.

Aspect 23: The method of any of Aspects 18-19, further comprising: transmitting a physical random access channel (PRACH) configuration for the one or more cells, wherein the PRACH configuration indicates random access channel (RACH) resources associated with respective cells from the one or more cells, and wherein at least one of the indication of the cell or the indication of the target beam index is based at least in part on the initial access procedure being associated with a RACH resource, from the RACH resources, that is associated with the cell.

Aspect 24: The method of Aspect 23, wherein the RACH resource includes at least one of: a time domain RACH occasion, one or more frequency domain resources, or a preamble.

Aspect 25: The method of any of Aspects 18-24, wherein at least one of the indication of the cell or the indication of the target beam index is included in a communication associated with the initial access procedure.

Aspect 26: The method of Aspect 25, wherein the communication is a Msg3 communication or a MsgA communication.

Aspect 27: The method of any of Aspects 25-26, wherein the indication of the cell is based at least in part on physical random access channel (PRACH) resources associated with the initial access procedure, and wherein the indication of the target beam index is included in the communication.

Aspect 28: The method of any of Aspects 18-27, wherein the initial access procedure is performed with the UE using a temporary cell radio network temporary identifier (C-RNTI).

Aspect 29: The method of any of Aspects 18-28, further comprising: transmitting, based on performing the initial access procedure, a handover command communication associated with the UE that indicates: system information associated with the cell, a cell radio network temporary identifier (C-RNTI) associated with the cell, and that the UE is to establish the connection with the cell.

Aspect 30: The method of any of Aspects 18-29, further comprising: transmitting a cell radio network temporary identifier (C-RNTI) medium access control (MAC) control element (MAC-CE) communication, associated with the UE, indicating a C-RNTI allocated for the UE for the cell and that the UE is to establish the connection with the cell.

Aspect 31: The method of Aspect 30, wherein the C-RNTI MAC-CE communication is included in a Msg5 or a MsgC of the initial access procedure.

Aspect 32: The method of Aspect 30, wherein the C-RNTI MAC-CE communication is included in a Msg4 or a MsgB of the initial access procedure.

Aspect 33: An apparatus for wireless communication at a device, comprising a processor; memory coupled with the processor; and instructions stored in the memory and executable by the processor to cause the apparatus to perform the method of one or more of Aspects 1-17.

Aspect 34: A device for wireless communication, comprising a memory and one or more processors coupled to the memory, the one or more processors configured to perform the method of one or more of Aspects 1-17.

Aspect 35: An apparatus for wireless communication, comprising at least one means for performing the method of one or more of Aspects 1-17.

Aspect 36: A non-transitory computer-readable medium storing code for wireless communication, the code comprising instructions executable by a processor to perform the method of one or more of Aspects 1-17.

Aspect 37: A non-transitory computer-readable medium storing a set of instructions for wireless communication, the set of instructions comprising one or more instructions that, when executed by one or more processors of a device, cause the device to perform the method of one or more of Aspects 1-17.

Aspect 38: An apparatus for wireless communication at a device, comprising a processor; memory coupled with the processor; and instructions stored in the memory and executable by the processor to cause the apparatus to perform the method of one or more of Aspects 18-32.

Aspect 39: A device for wireless communication, comprising a memory and one or more processors coupled to the memory, the one or more processors configured to perform the method of one or more of Aspects 18-32.

Aspect 40: An apparatus for wireless communication, comprising at least one means for performing the method of one or more of Aspects 18-32.

Aspect 41: A non-transitory computer-readable medium storing code for wireless communication, the code comprising instructions executable by a processor to perform the method of one or more of Aspects 18-32.

Aspect 42: A non-transitory computer-readable medium storing a set of instructions for wireless communication, the set of instructions comprising one or more instructions that, when executed by one or more processors of a device, cause the device to perform the method of one or more of Aspects 18-32.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
one or more memories; and
one or more processors, coupled to the one or more memories, configured to:
receive an indication of at least one of:
one or more anchor cells associated with a target cell, or
one or more target cells, including the target cell, associated with an anchor cell included in the one or more anchor cells,
wherein the anchor cell is associated with a first operating frequency range and the one or more target cells are associated with a second operating frequency range;
transmit, to the anchor cell, an indication of the target cell and an indication of a target beam index associated with the target cell as part of an initial access procedure with the anchor cell; and
establish a connection with the target cell based at least in part on performing the initial access procedure with the anchor cell.

2. The UE of claim 1, wherein the one or more anchor cells are associated with the first operating frequency range.

3. The UE of claim 1, wherein at least one of the indication of the target cell or the indication of the target beam index is based at least in part on physical random access channel (PRACH) resources used by the UE to perform the initial access procedure with the anchor cell.

4. The UE of claim 1, wherein the one or more processors are further configured to:
receive, from the anchor cell, different physical random access channel (PRACH) configurations for the one or more target cells; and
wherein at least one of the indication of the target cell or the indication of the target beam index is based at least in part on using a PRACH configuration, from the different PRACH configurations, that is associated with the target cell.

5. The UE of claim 4, wherein the different PRACH configurations are associated with at least one of:
same time domain resources and different frequency domain resources,
different time domain resources and same frequency domain resources, or
different time domain resources and different frequency domain resources.

6. The UE of claim 4, wherein the indication of the target cell is based at least in part on using the PRACH configuration, and wherein the indication of the target beam index is based at least in part on at least one of a time domain resource or a frequency domain resource, associated with the PRACH configuration, that is used for the initial access procedure.

7. The UE of claim 1, wherein the one or more processors are further configured to:
receive, from the anchor cell, a physical random access channel (PRACH) configuration for the one or more target cells, wherein the PRACH configuration indicates random access channel (RACH) resources associated with respective target cells from the one or more target cells, and wherein at least one of the indication of the target cell or the indication of the target beam index is based at least in part on using a RACH resource, from the RACH resources, that is associated with the target cell.

8. The UE of claim 1, wherein at least one of the indication of the target cell or the indication of the target beam index is included in a communication associated with the initial access procedure.

9. The UE of claim 8, wherein the indication of the target cell is based at least in part on physical random access channel (PRACH) resources used by the UE to perform the initial access procedure with the anchor cell, and wherein the indication of the target beam index is included in the communication.

10. The UE of claim 1, wherein the initial access procedure is performed with the anchor cell using a temporary cell radio network temporary identifier (C-RNTI).

11. The UE of claim 1, wherein the one or more processors are further configured to:
receive, from the anchor cell and based on performing the initial access procedure, a handover command communication that indicates:
system information associated with the target cell,
a cell radio network temporary identifier (C-RNTI) associated with the target cell, and
that the UE is to establish the connection with the target cell.

12. The UE of claim 1, where the UE obtains system information associated with the target cell prior to performing the initial access procedure with the anchor cell, and wherein the one or more processors are further configured to:
receive, from the anchor cell, a cell radio network temporary identifier (C-RNTI) medium access control (MAC) control element (MAC-CE) communication indicating a C-RNTI allocated for the UE for the target cell and that the UE is to establish the connection with the target cell.

13. The UE of claim 1, wherein the one or more processors, to establish the connection with the target cell, are configured to:
receive, from the target cell, a downlink control channel order for performing a contention-free random access procedure with the target cell; and
establish a radio resource control (RRC) connection with the target cell based at least in part on performing the contention-free random access procedure.

14. A network node for wireless communication, comprising:
one or more memories; and
one or more processors, coupled to the one or more memories, configured to:
transmit an indication of at least one of one or more cells associated with the network node, wherein the network node supports initial access for the one or more cells, and wherein the one or more cells are associated with a different operating frequency band than the network node;
receive an indication of a cell, from the one or more cells, and an indication of a target beam index associated with the cell as part of an initial access procedure associated with a user equipment (UE); and
transmit a communication to cause the UE to establish a connection with the cell based at least in part on performing the initial access procedure.

15. The network node of claim 14, wherein at least one of the indication of the cell or the indication of the target beam index is based at least in part on physical random access channel (PRACH) resources used by the UE to perform the initial access procedure with the network node.

16. A method of wireless communication performed by a user equipment (UE), comprising:
receiving an indication of at least one of:
one or more anchor cells associated with a target cell, or
one or more target cells, including the target cell, associated with an anchor cell included in the one or more anchor cells,
wherein the anchor cell is associated with a first operating frequency range and the one or more target cells are associated with a second operating frequency range;
transmitting, to the anchor cell, an indication of the target cell and an indication of a target beam index associated with the target cell as part of an initial access procedure with the anchor cell; and
establishing a connection with the target cell based at least in part on performing the initial access procedure with the anchor cell.

17. The method of claim 16, wherein the one or more anchor cells are associated with the first operating frequency range.

18. The method of claim 16, wherein at least one of the indication of the target cell or the indication of the target beam index is based at least in part on physical random access channel (PRACH) resources used by the UE to perform the initial access procedure with the anchor cell.

19. The method of claim 16, further comprising:
receiving, from the anchor cell, different physical random access channel (PRACH) configurations for the one or more target cells; and
wherein at least one of the indication of the target cell or the indication of the target beam index is based at least in part on using a PRACH configuration, from the different PRACH configurations, that is associated with the target cell.

20. The method of claim 19, wherein the different PRACH configurations are associated with at least one of:
same time domain resources and different frequency domain resources,
different time domain resources and same frequency domain resources, or
different time domain resources and different frequency domain resources.

21. The method of claim 19, wherein the indication of the target cell is based at least in part on using the PRACH configuration, and wherein the indication of the target beam index is based at least in part on at least one of a time domain resource or a frequency domain resource, associated with the PRACH configuration, that is used for the initial access procedure.

22. The method of claim 16, further comprising:
receiving, from the anchor cell, a physical random access channel (PRACH) configuration for the one or more target cells, wherein the PRACH configuration indicates random access channel (RACH) resources associated with respective target cells from the one or more target cells, and wherein at least one of the indication of the target cell or the indication of the target beam index is based at least in part on using a RACH resource, from the RACH resources, that is associated with the target cell.

23. The method of claim 16, wherein at least one of the indication of the target cell or the indication of the target beam index is included in a communication associated with the initial access procedure, wherein the communication is a third message in a four-step random access procedure or is included in a shared channel payload in a first message in a two-step random access procedure.

24. The method of claim 23, wherein the indication of the target cell is based at least in part on physical random access channel (PRACH) resources used by the UE to perform the initial access procedure with the anchor cell, and wherein the indication of the target beam index is included in the communication.

25. The method of claim 16, wherein the initial access procedure is performed with the anchor cell using a temporary cell radio network temporary identifier (C-RNTI).

26. The method of claim 16, further comprising:
receiving, from the anchor cell and based on performing the initial access procedure, a handover command communication that indicates:
system information associated with the target cell,
a cell radio network temporary identifier (C-RNTI) associated with the target cell, and
that the UE is to establish the connection with the target cell.

27. The method of claim 16, where the UE obtains system information associated with the target cell prior to performing the initial access procedure with the anchor cell, the method further comprising:
receiving, from the anchor cell, a cell radio network temporary identifier (C-RNTI) medium access control (MAC) control element (MAC-CE) communication indicating a C-RNTI allocated for the UE for the target cell and that the UE is to establish the connection with the target cell.

28. The method of claim 16, wherein establishing the connection with the target cell comprises:
receiving, from the target cell, a downlink control channel order for performing a contention-free random access procedure with the target cell; and
establishing a radio resource control (RRC) connection with the target cell based at least in part on performing the contention-free random access procedure.

29. A method of wireless communication performed by a network node, comprising:
transmitting an indication of at least one of one or more cells associated with the network node, wherein the network node supports initial access for the one or more cells, and wherein the one or more cells are associated with a different operating frequency band than the network node;
receiving an indication of a cell, from the one or more cells, and an indication of a target beam index associated with the cell as part of an initial access procedure associated with a user equipment (UE); and
transmitting a communication to cause the UE to establish a connection with the cell based at least in part on performing the initial access procedure.

30. The method of claim 29, wherein at least one of the indication of the cell or the indication of the target beam index is based at least in part on physical random access channel (PRACH) resources used by the UE to perform the initial access procedure with the network node.

* * * * *